PRIOR ART SYSTEM

INVENTOR.
JOSEPH A. WEISBECKER

BY John V. Regan

ATTORNEY

INVENTOR.
JOSEPH A. WEISBECKER
BY John V. Regan
ATTORNEY

INVENTOR.
JOSEPH A. WEISBECKER
BY John V. Regan
ATTORNEY

INVENTOR.
JOSEPH A. WEISBECKER
BY John V. Regan
ATTORNEY

INVENTOR.
JOSEPH A. WEISBECKER
BY John V. Regan
ATTORNEY

OPERATION RETRIEVAL CONTROL CIRCUITS

INVENTOR.
JOSEPH A. WISBECKER
BY John V. Regan
ATTORNEY

TIME PULSE GENERATOR AND TIMING

INVENTOR.
JOSEPH A. WEISBECKER
BY John V. Regan
ATTORNEY

March 14, 1967 J. A. WEISBECKER 3,309,679

DATA PROCESSING SYSTEM

Original Filed July 31, 1962 15 Sheets-Sheet 8

OPERATION RETRIEVAL FLOW CHART

PROGRAM FLOW CHART

INVENTOR.
JOSEPH A. WEISBECKER
BY John V. Regan
ATTORNEY

| MEMORY LOCATION | CONTENTS | |
|---|---|---|
| 0 0 0 0 0 | 0 0 0 0 0 0 | INTERPRETIVE EO ROUTINE TABLE |
| 0 0 0 0 1 | 0 0 1 0 0 0 | |
| 0 0 0 0 2 | 0 0 1 0 6 0 | |
| ⋮ | ⋮ | |
| | $D_6$ $D_5$ $D_4$ $D_3$ $D_2$ $D_1$ | |
| 0 0 1 0 0 | 1 3 7 0 7 7 | INTERPRETIVE EO ROUTINE FOR EXECUTION OF SECTOR TRANSFER INSTRUCTION (IN1) |
| 0 0 1 0 1 | 2 5 7 0 7 7 | |
| 0 0 1 0 2 | 3 0 1 0 0 7 | |
| 0 0 1 0 3 | 4 0 0 0 0 7 | |
| 0 0 1 0 4 | 0 0 0 0 0 0 | |
| 0 0 1 0 5 | 0 0 0 0 0 0 | |
| 0 0 1 0 6 | 1 3 7 0 7 7 | INTERPRETIVE EO ROUTINE FOR EXECUTION OF ADD INSTUCTION (IN2) |
| 0 0 1 0 7 | 1 4 7 0 6 7 | |
| 0 0 1 1 0 | 2 5 7 0 7 7 | |
| 0 0 1 1 1 | 4 0 0 0 0 7 | |
| 0 0 1 1 2 | 0 0 0 0 0 0 | |
| ⋮ | ⋮ | |
| | $D_6$ $D_5$ $D_4$ $D_3$ $D_2$ $D_1$ | |
| 0 0 2 0 0 | 0 2 0 0 0 0 | PROGRAM |
| 0 0 2 0 1 | 0 0 2 1 3 0 | |
| 0 0 2 0 2 | 0 0 3 0 1 0 | |
| 0 0 2 0 3 | 0 0 3 0 4 0 | |
| 0 0 2 0 4 | 1 4 0 0 6 7 | |
| 0 0 2 0 5 | 2 5 0 0 7 7 | |
| 0 0 2 0 6 | 0 1 0 0 0 0 | |
| 0 0 2 0 7 | 0 0 3 0 5 0 | |
| 0 0 2 1 0 | 0 0 3 0 6 0 | |
| 0 0 2 1 1 | 0 0 4 0 0 0 | |
| 0 0 2 1 2 | 0 0 0 0 0 7 | |
| 0 0 2 1 3 | 0 0 0 0 0 1 | |
| ⋮ | ⋮ | |

MEMORY UNIT CONTENTS

FIG. 8

INVENTOR.
JOSEPH A. WEISBECKER
BY John V. Regan
ATTORNEY

| | MEMORY LOCATION | INITIAL CONTENTS | CONTENTS AFTER A | CONTENTS AFTER C | CONTENTS AFTER D |
|---|---|---|---|---|---|
| WORK AREA | 00300 | 000000 | 000000 | 000000 | 000000 |
| | 00301 | 000003 | 000003 | 000003 | 000003 |
| | 00302 | 000002 | 000002 | 000002 | 000002 |
| | 00303 | 000000 | 000000 | 000000 | 000000 |
| | 00304 | 000000 | 000004 | 000004 | 000004 |
| | 00305 | 000000 | 000000 | 000006 | 000006 |
| | • • • | • • • | • • • | • • • | • • • |
| WRITE OUT AREA | 00400 | 000000 | 000000 | 000000 | 000006 |
| | 00401 | 002712 | 002712 | 002712 | 002712 |
| | 00402 | 000462 | 000462 | 000462 | 000462 |
| | • • • | • • • | • • • | • • • | • • • |

MEMORY UNIT CONTENTS

FIG. 9

INVENTOR.
JOSEPH A. WEISBECKER
BY John V. Regan
ATTORNEY

MEMORY TIMING DIAGRAM

INVENTOR.
JOSEPH A. WEISBECKER
BY John V. Regan
ATTORNEY

March 14, 1967 J. A. WEISBECKER 3,309,679

DATA PROCESSING SYSTEM

Original Filed July 31, 1962 15 Sheets-Sheet 12

ARITHMETIC UNIT CYCLE

INVENTOR.
JOSEPH A. WEISBECKER
BY John V. Regan
ATTORNEY

INVENTOR.
JOSEPH A. WEISBECKER
BY John V. Regan
ATTORNEY

INVENTOR.
JOSEPH A. WEISBECKER
BY John V. Regan
ATTORNEY

INVENTOR.
JOSEPH A. WEISBECKER
BY John V. Regan
ATTORNEY

United States Patent Office 3,309,679

Patented Mar. 14, 1967

3,309,679

DATA PROCESSING SYSTEM

Joseph A. Weisbecker, Cherry Hill, N.J., assignor to Radio Corporation of America, a corporation of Delaware

Continuation of application Ser. No. 213,781, July 31, 1962. This application June 23, 1966, Ser. No. 560,011

22 Claims. (Cl. 340—172.5)

This application represents a continuation of a copending application, Ser. No. 213,781, filed on July 31, 1962.

This invention relates to data processing systems, and particularly to data processing system of the stored program type.

Stored programmed systems are arranged to perform various functions using a set of instruction words. By combining these instruction words in various sequences (programs) the system can be directed to carry out complex functions. Each program consists of a particular sequence of instruction words. Each instruction word usually defines a specific operation to be performed and has one or more data addresses.

An instruction is carried out in one or more steps with the number of steps varying with the complexity of the operation. For example, an add instruction requires few steps while a divide instruction may require many steps. The execution of the instructions is a function of the control unit of the machine which comprises storage elements such as flip-flops, and gating elements through which control signals are routed.

After a system is initially designed, it often becomes apparent that increased efficiency or reduced cost could be achieved by different instruction routings. In most instances, these changes cannot be readily incorporated in the designed machine because of the amount of rewiring involved in changing the control unit.

The major design effort in constructing a data processing system is concerned with the control unit since, in the average case, several thousand separate gates and numerous flip-flops are used. The gates and flip-flops are wired into logical networks so that any specified instruction is properly sequenced.

The control signals generated by the control unit then serve to route data to and from various functional units such as the arithmetic unit, buffers, peripheral devices, and so on. It is obvious that once a control unit is thus wired, it is difficult to change the instruction complement and the manner of their execution because of the extensive rewiring of the logical gates and flip-flops.

Further, once the control unit is wired for operation with particular type functional units, then it is uneconomic to change from one type functional unit to another. For example in a particular application, it may be desirable to replace the present arithmetic unit with another which operates at a higher speed. Hence, although it is desirable from an applications view, to have a flexible system arrangement which permits newer or different functional units to be used, this has not been possible as a practical matter in prior systems because of the time and cost involved in changing the control unit. Moreover, in prior systems, the use of new or different functional units systems requires extensive reprogramming which is expensive and time-consuming.

From the above, it is apparent that it is desirable to reduce as much as possible the amount of preset wiring of the control unit. However, this reduction in wiring, at the same time, should not accomplish a corresponding reduction in the applications for which the machine is suitable, as is the case with so-called special purpose processors. Moreover, a reduction in the amount of wiring in the control unit is desirable because of the corresponding reduction in the testing and maintenance required during the building and operation of the system.

It is an object of the present invention to provide a general purpose data processing apparatus wherein the control unit is appreciably simplified with respect to prior art apparatuses of similar type.

It is another object of the present invention to provide improved data processing apparatus in which the control unit requires a reduced amount of wiring and without reducing the applications for which the apparatus is suitable.

Another object of the invention is to provide improved data processing systems, capable of being readily adapted to new applications without requiring extensive rewiring.

Another object of the invention is to provide improved data processing systems in which the various functional units can be interchanged with other functional units without requiring extensive rewiring and reprogramming of the system.

Another object of the invention is to provide an improved data processing system in which the programmer can directly control basic operations in the system thereby permitting a variable instruction format to be used. That is, new instructions can be generated by the programmer as needed.

A study of the control unit response to various instructions indicates that many of the machine steps generated in selecting and executing the instructions are themselves of general purpose nature. For example, most instructions involve a transfer of data from one designated unit to another. However, because the transmitting and receiving units are different during different instructions, each transfer in prior systems often requires its own set of logical gates even though the functions are similar. A system, according to the present invention, implements these basic machine steps using machine words stored in a memory unit. Each of these machine words contains control bits necessary to set up desired conditions and to allow for execution. Each machine word is identified by one or more bits to distinguish a machine word from an instruction word. These machine words (termed elementary operations) are stored in the memory unit in a particular sequence determined by the programmer. The memory unit may be a magnetic core memory of the random-access type. The "1" and "0" information bits stored in the memory cores assigned to a machine word then replace wired logical elements which would otherwise be required in the control unit. It is well known that the cost of a memory element per bit is appreciably less than that of a logical element such as a gate or flip-flop. Further, the information content of a machine word can be changed by simply erasing the word in the memory (if the memory is of the erasable type) and inserting a new word in its place in the memory—no rewiring is involved. The effect of the new machine word is equivalent to rewiring a control or data path in prior art systems. If a fixed type memory is used to store the machine words, then any rewiring involved is greatly reduced over what was done in prior systems to change the control paths for like results.

An instruction in a system embodying the present invention is, then, performed according to a set of machine steps which correspond to a set of elementary operations stored in the memory.

The instruction is first staticized with its necessary addresses as in prior systems. Its operation code is then sensed and control is transferred to the elementary operation units which select from the memory a format of elementary operations necessary to carry out the instruction. The control is then transferred back to the instruction staticizing unit and the next instruction is staticized, and so on.

Each elementary operation word is read from the memory, and the control bits decoded to provide a corresponding output level. This output level then activates a particular flow path, for data, transfer or memory addressing, or performs a specified test for terminal conditions, and so on.

Since each instruction is now defined by a stored interpretive routine of elementary operations, the particular manner in which it is performed can be readily changed by using a different interpretive routine of the elementary operations. Further, since the elementary operations themselves are of general purpose nature, a relatively small number of these are required to define a relatively large number of instructions.

Also, a standard system can be designed with a given complement of functional units. This standard system can then be easily modified to use other functional units by using a different set of the interpretive elementary operations for executing any instructions involving the new units. However, the instruction program remains the same as that used before the different set of elementary operations and no system reprogramming is necessary. For example, a standard system using a binary adder unit can be modified to use a decimal adder unit without requiring that the control unit be rewired.

Further, because the elementary operations are represented by coded machine words in the memory, they can be handled in a manner directly analogous to the way instruction words are handled by present-day machines. The coded digits representing the machine steps may be arranged to have option bits to automatically control the sequencing of the elementary operations themselves. Thus, with respect to the elementary operations, direct or indirect addressing, conditional branching among the elementary operations, data dependent loops of elementary operations, and, so on, may be used.

Each machine step may involve a memory access in order to retrieve the elementary operation from the memory. In certain applications it is desirable that one or more of the instructions be executed at a high speed. In such case, it is desirable to provide logic gates arranged to directly execute the instruction. Accordingly, the operation retrieval circuitry of the invention may be arranged, if desired, to permit a relatively simple connection of control modules defining the particular operations desired to be directly executed. This arrangement affords a further degree of flexibility and expandability of the basic machine design.

Moreover, the elementary operations can be incorporated into the instruction program itself, if so desired, permitting the programmer a still greater flexibility in arranging the various programs for more efficient use of the functional units.

FIGURE 3 (comprising FIGURES 3A, 3B, 3C and 3D) is a more detailed schematic diagram of a data processing system according to the invention. The chart for assembling FIGURE 3 is indicated in FIGURE 3A.

Figure 3A:
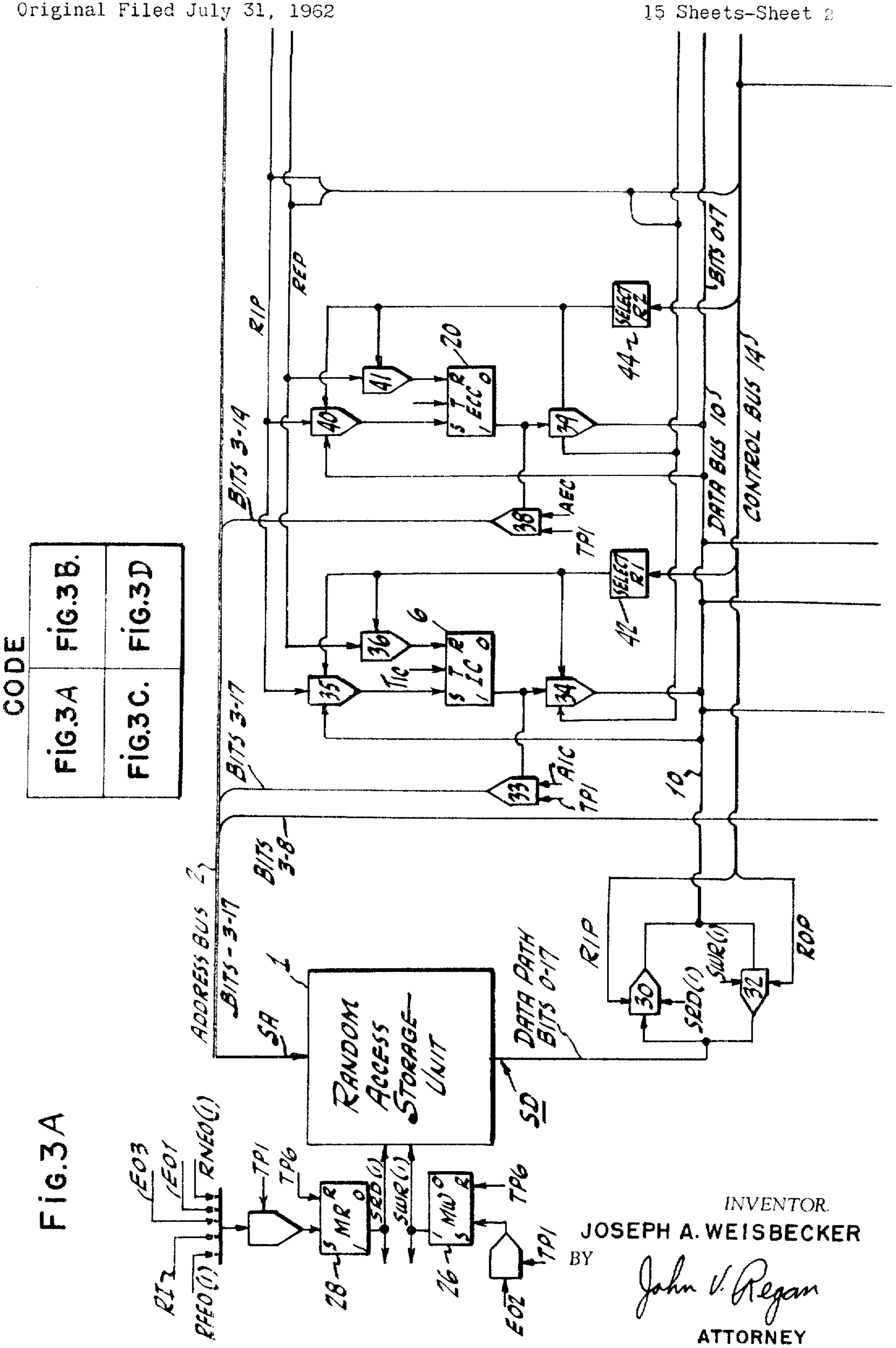
Figure 3B:
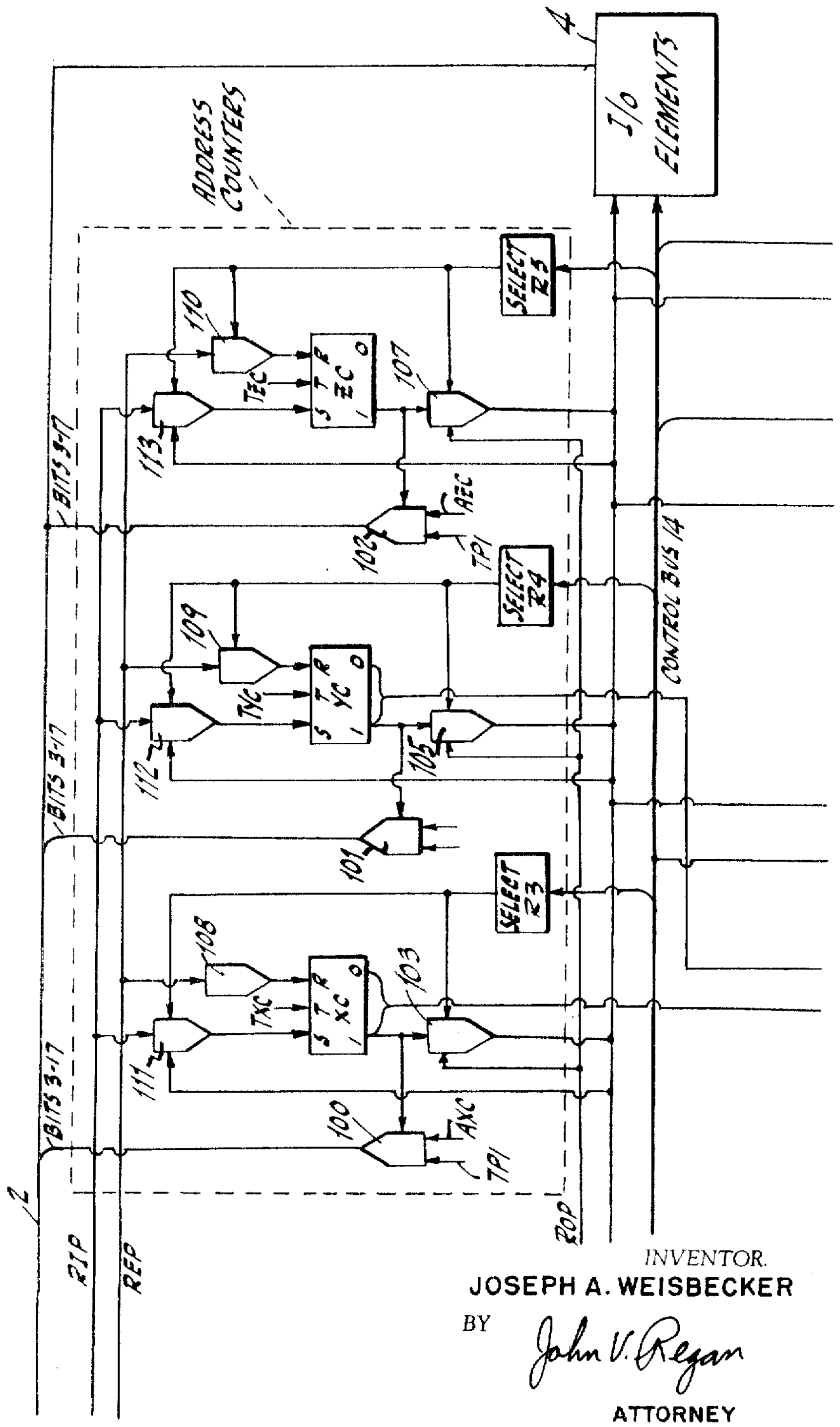
Figure 3C:
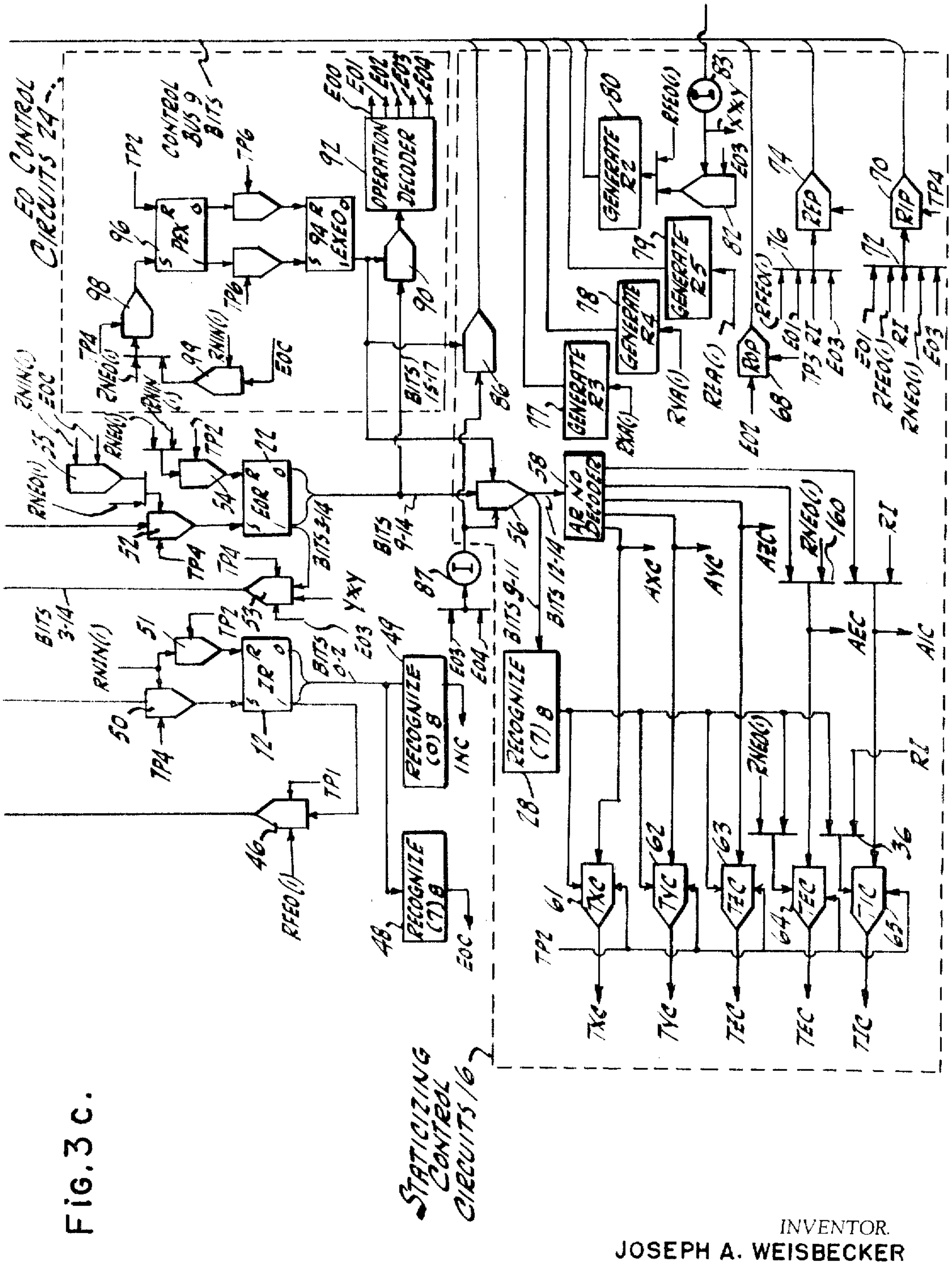
Figure 3D:
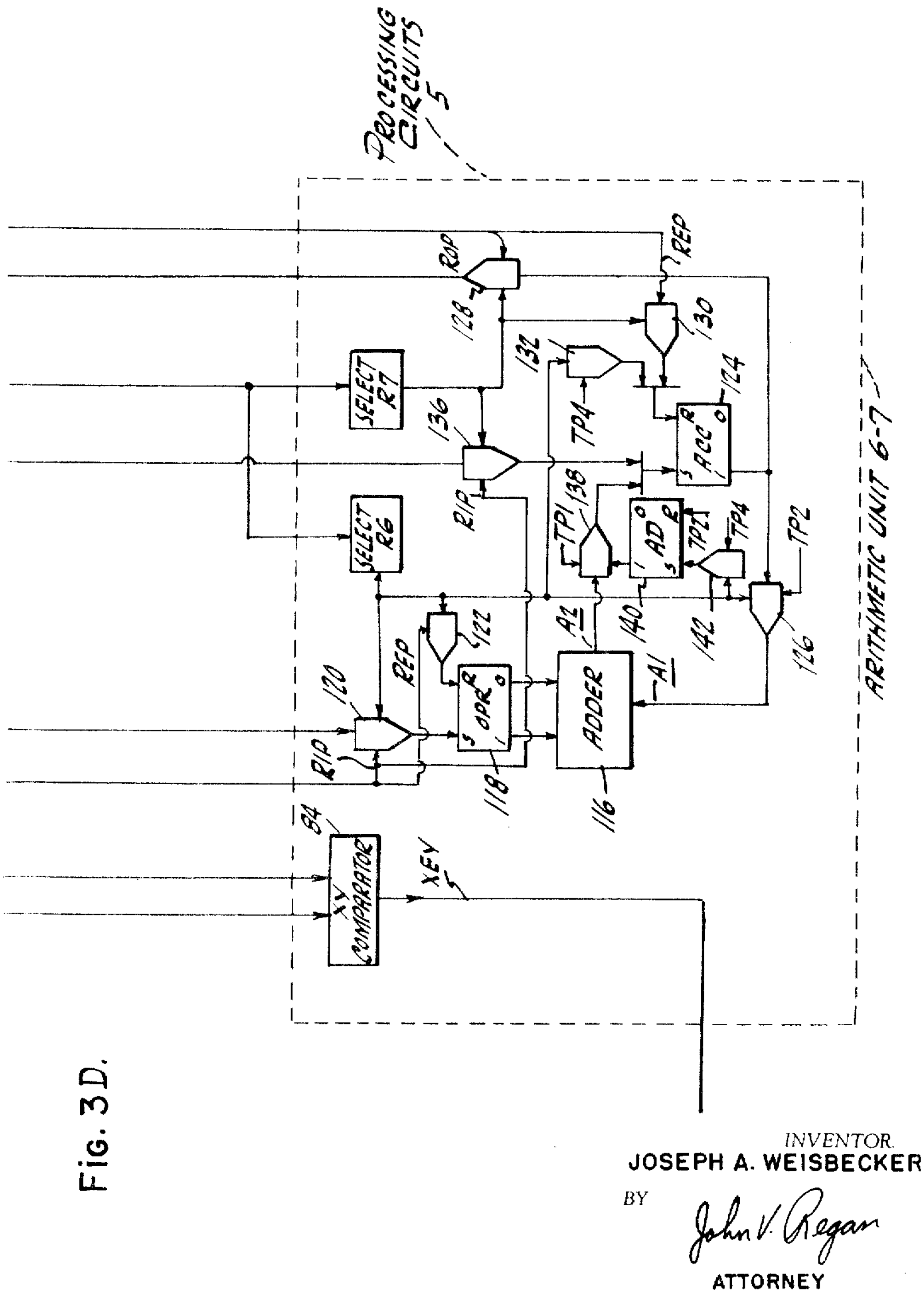
Figure 4:
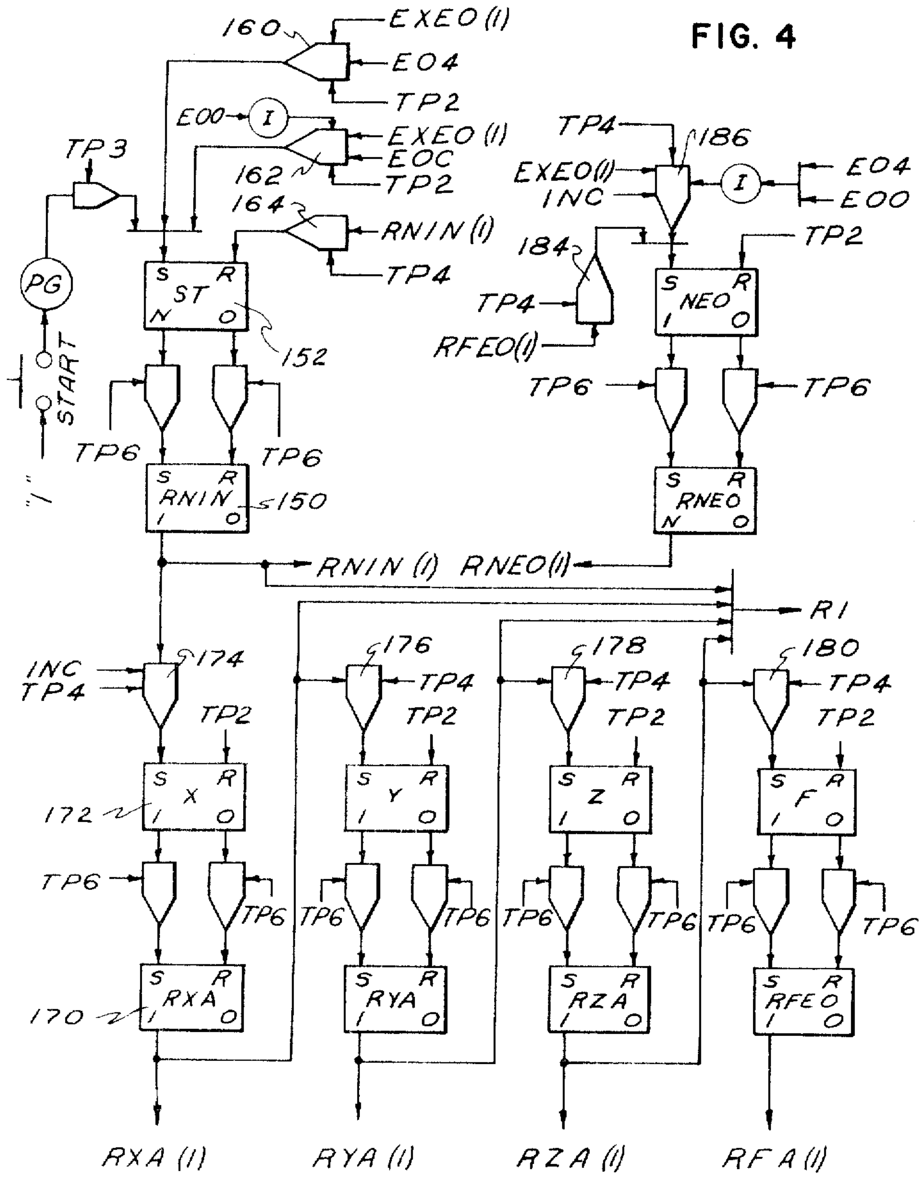
Figure 5:
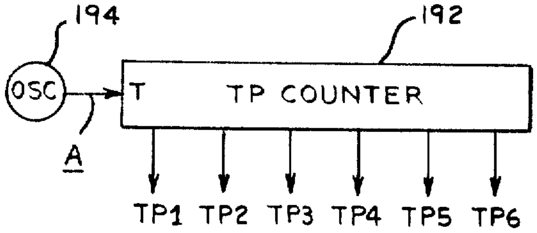
Figure 6:
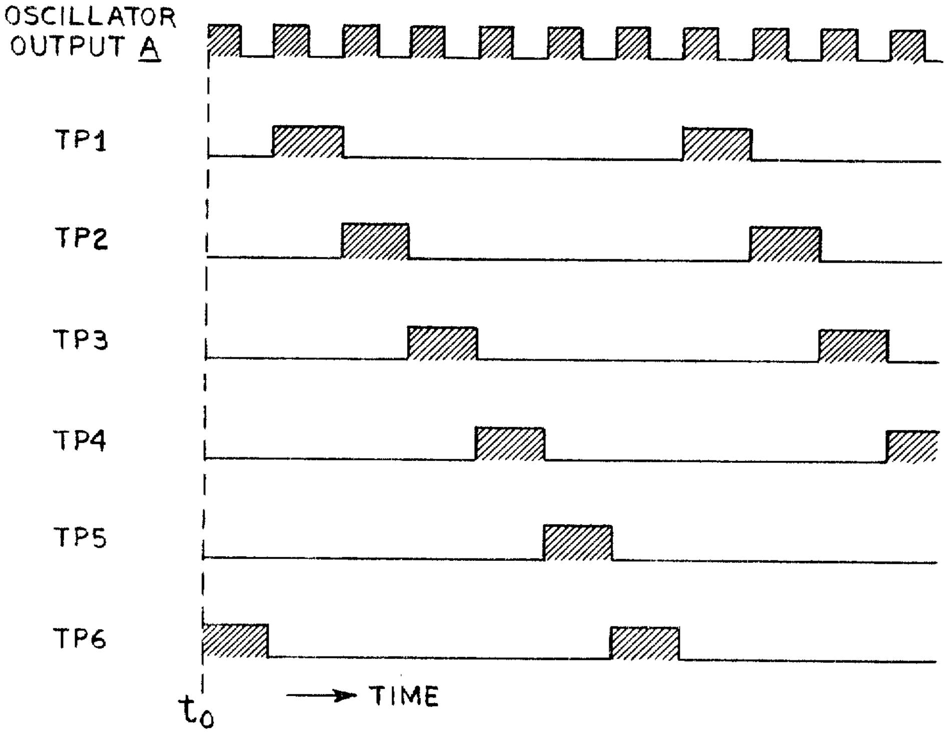
Figure 10:
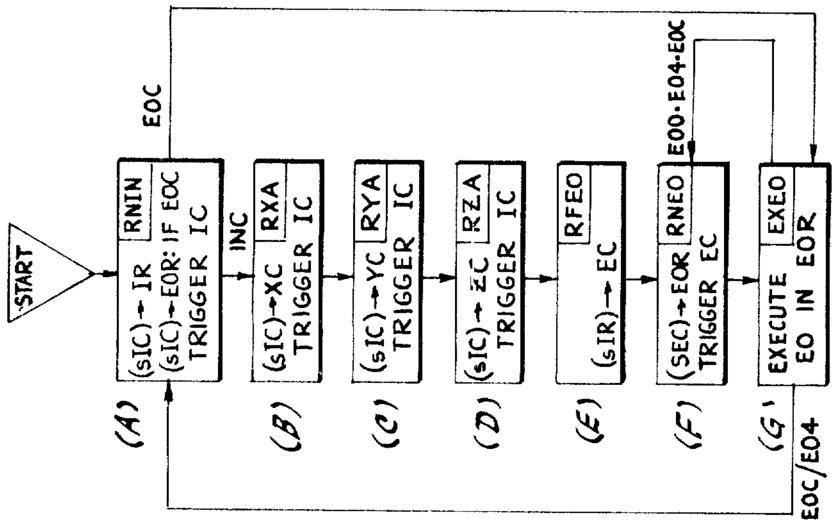
Figure 7:
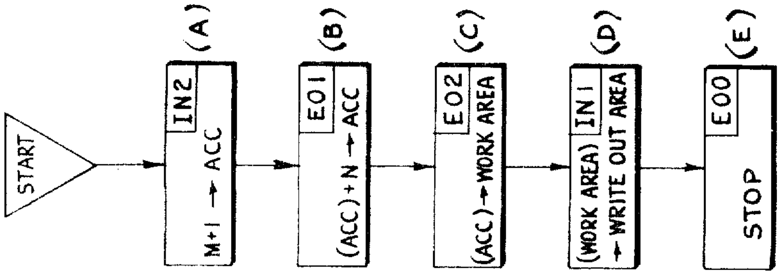
Figure 11:
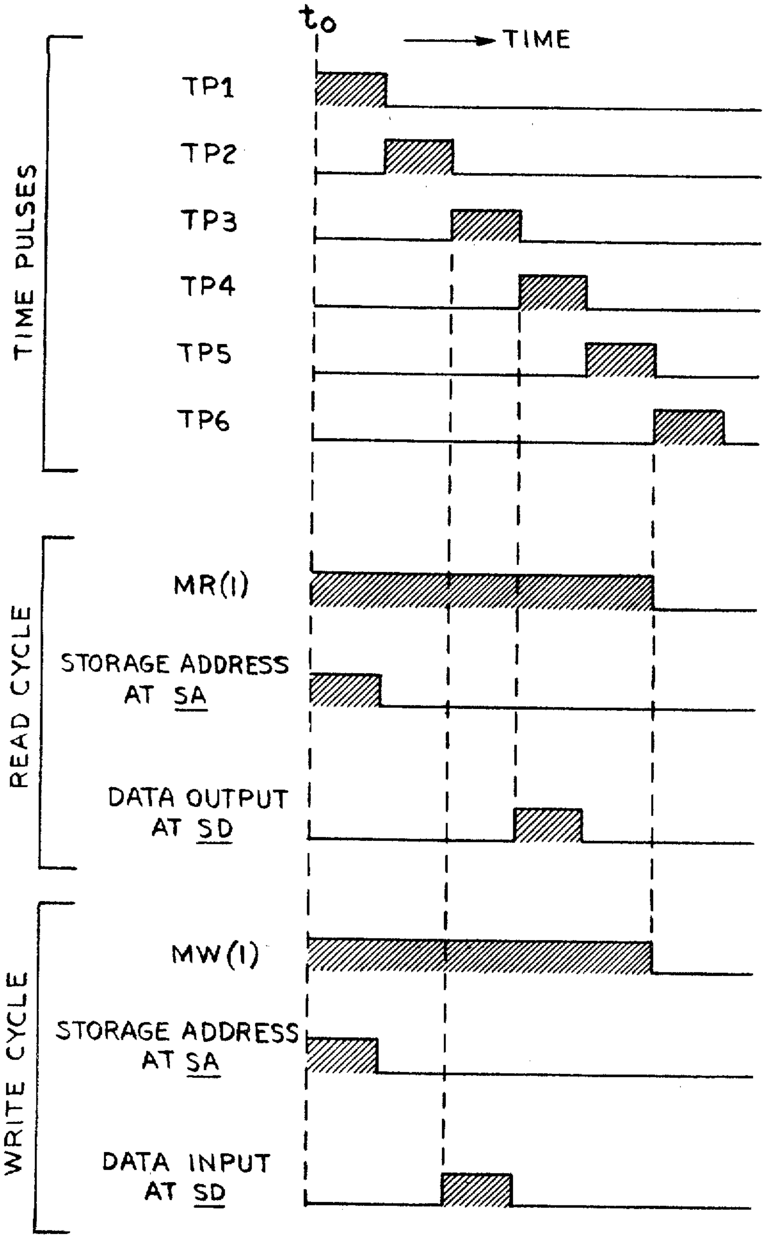
Figure 12:
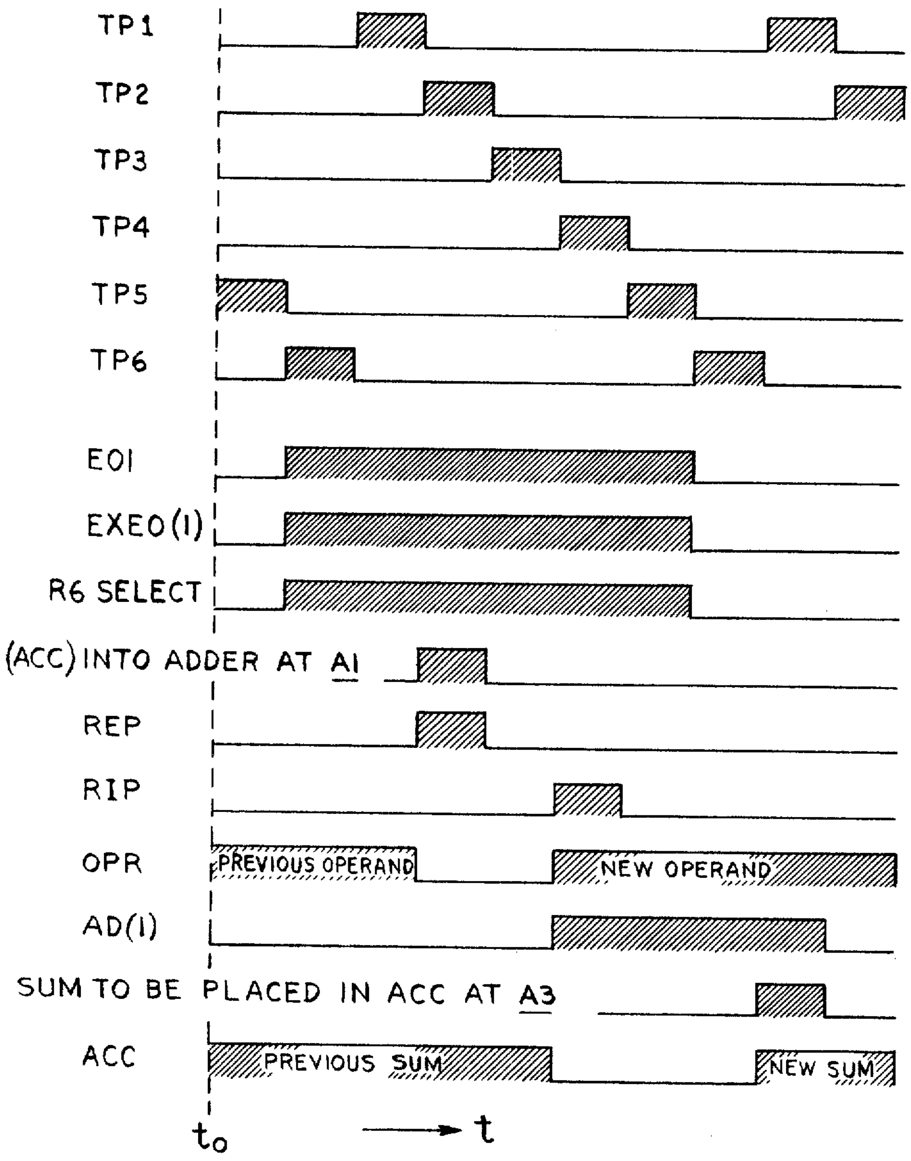
Figure 15:
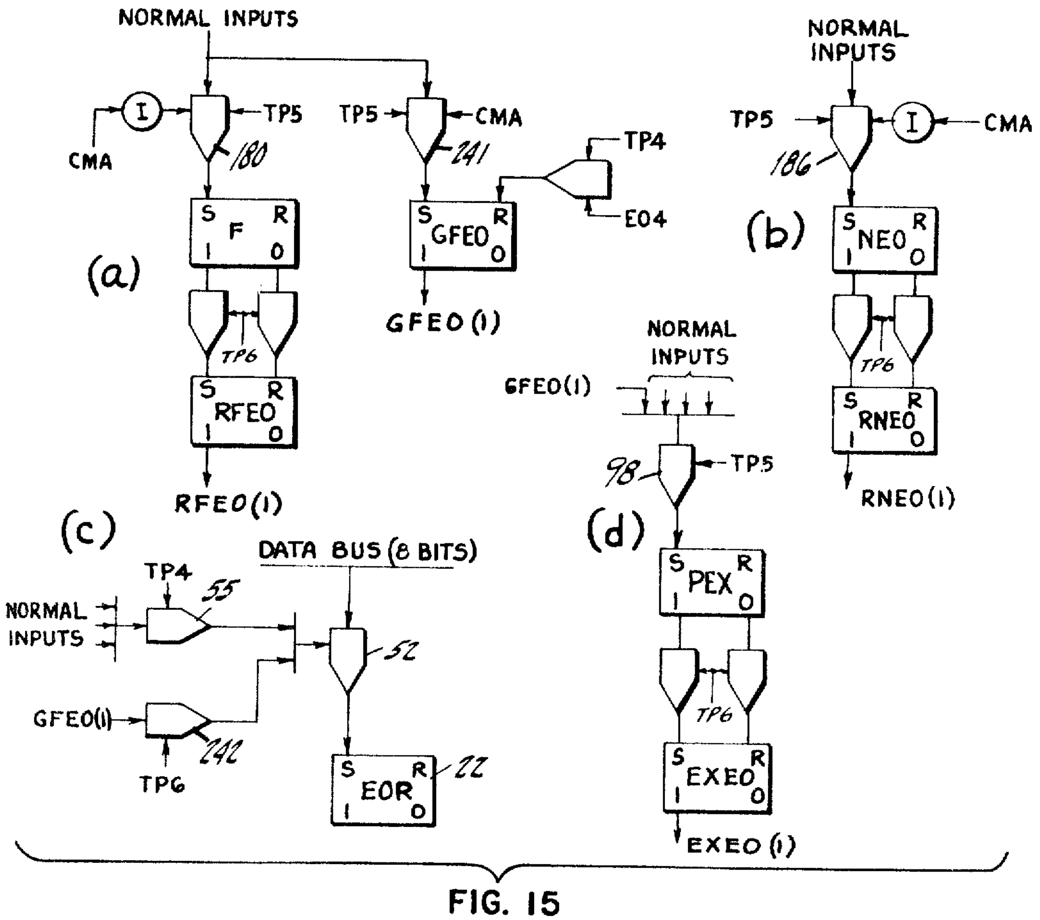
Figure 13:
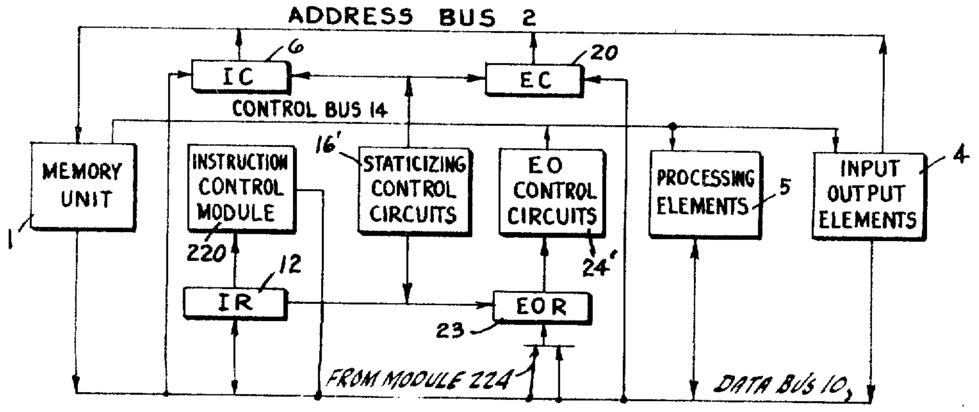
Figure 14:
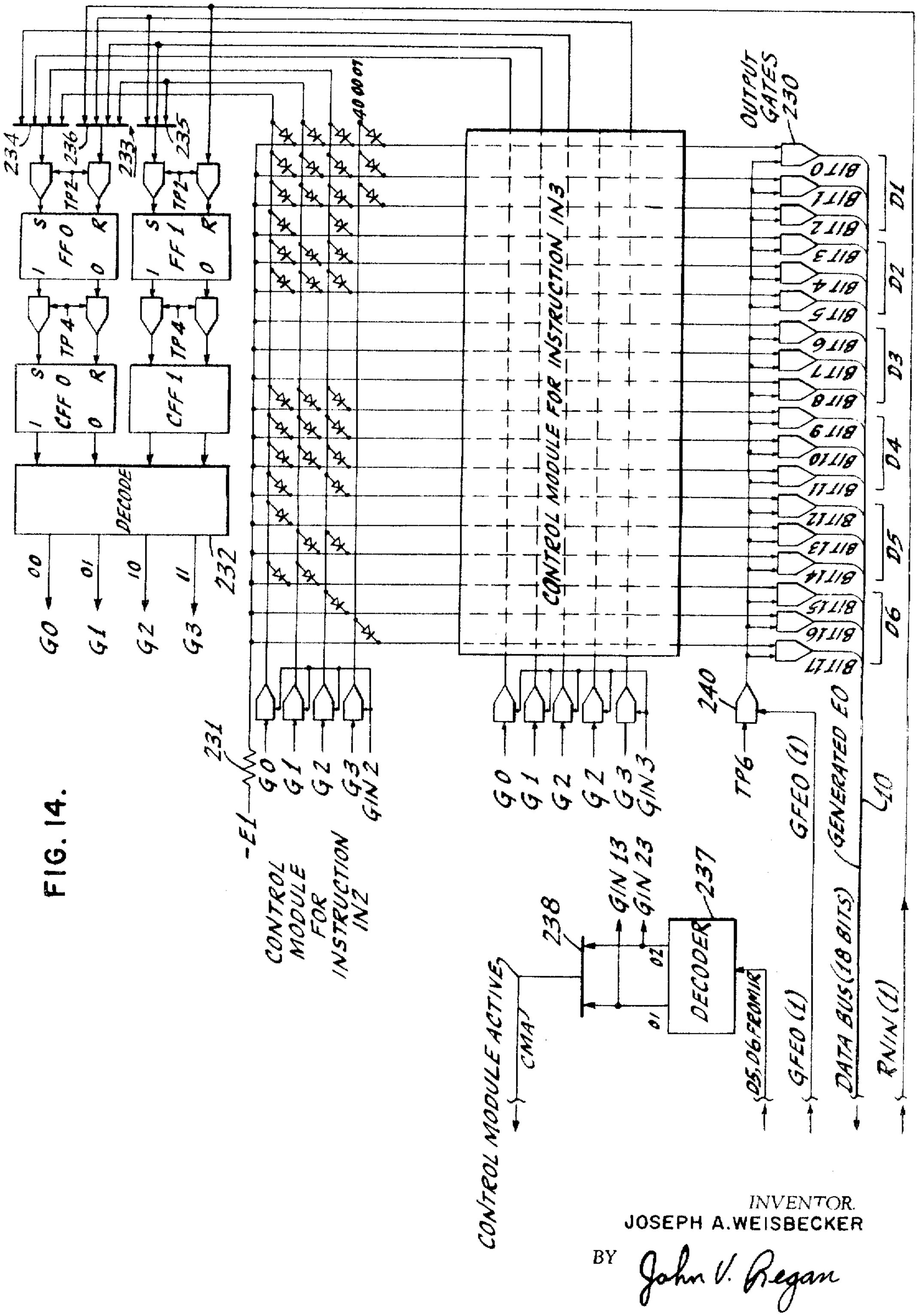

FIGURE 4 is a schematic diagram of operation retrieval circuits used for generating operation levels for the system of FIGURE 3;

FIGURE 5 is a schematic diagram of a timing pulse generator for generating the timing pulses used in the system of the invention;

FIGURE 6 is a diagram showing the relation of the timing pulses;

FIGURE 7 is a program flow diagram of an exemplary program used in explaining the system operation;

FIGURE 8 is a table illustrating the memory locations of instructions and elementary operations used in executing the exemplary program;

FIGURE 9 is another table illustrating the changes in data stored at various memory locations during the execution of the program;

FIGURE 10 is a flow diagram illustrating the operation of the retrieval circuits of FIGURE 9;

FIGURE 11 is a timing diagram illustrating the operation of the memory units of FIGURE 3;

FIGURE 12 is a timing diagram illustrating the operation of the arithmetic unit of FIGURE 3;

FIGURE 13 is a block diagram of a modified system using fixed control modules for implementing certain instructions;

FIGURE 14 is a schematic diagram of one form of instruction control module useful in the system of FIGURE 13;

FIGURE 15 is a block diagram of the modifications in the operation retrieval circuits, i.e., control circuits, when instruction control modules are used.

Figure 16:
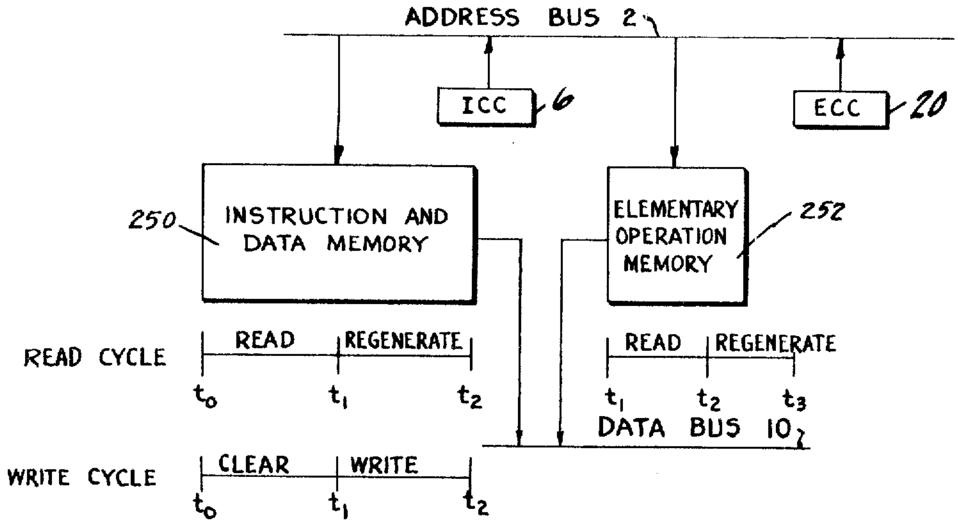
Figure 17:
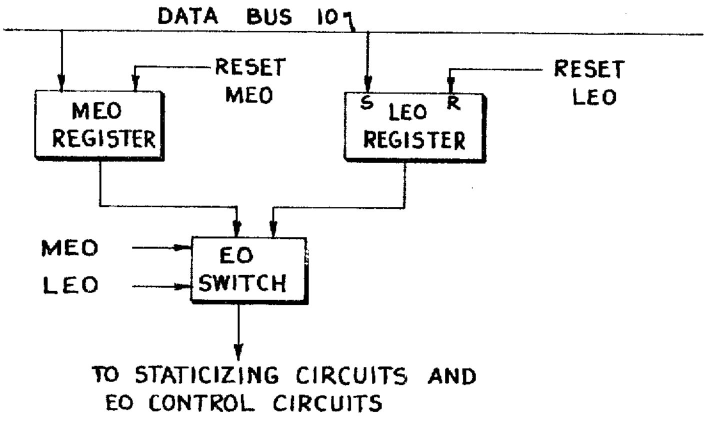

FIGURE 16 is a diagram of a system according to the invention using two separate memories; and FIGURE 17 is a diagram of a system according to the invention having a pair of elementary operation registers.

GENERAL

For convenience of description, the invention is exemplified as embodied in a simplified processing system of the synchronous type. Further, the operation of the system is limited to a description of several typical instructions, which are common to most data processing operations. It is understood, however, that the invention is applicable to more complicated type systems including asynchronous types, and, that, in practice, many more elementary operations would be used in executing other instruction sequences. These additional elementary operations would be arranged in a manner similar to, and function in a manner similar to, those described in connection with the exemplary system.

Also for convenience of description, the system is assumed to be nominally of the three-address type, and to have a word length of eighteen binary digits.

DEFINITIONS

The elementary operations and instruction words are defined as follows:

An EO (elementary operation) is represented by one, 18 bit word with the following format in octal digits, each representing three binary digits:

D6 D5 D4 D3 D2 D1

D1: Class Digit
  D1 must be 7 (111)
D2–D5: Control Digits, respectively
  These digits can be used for a variety of purposes described later for each EO type.
D6: Operation Code
  D6 specifies the type of operation to be executed.

An instruction is represented as four, 18 bit words as follows:

Operation Word—D6 D5 D4 D3 D2 D1
D1: Class Digit
  D1 must be 0 (000)
D2–D4: Control Digits, respectively
D5–D6: Operation Code
  These digits specify the system operation (or interpretive EO routine) to be performed.
Address Words
  Three address words are associated with each operation word. These addresses are placed in the X, Y and Z counters, respectively.

SYSTEM ELEMENTS

Each of the elements used in the system is known per se in the art. Three types of logical gating gates are used, namely "and,' "or" and "inhibit." Each type of these gates may be implemented in known fashion using diodes and transistors. See for example Chapter 16 or vol. II of "Handbook of Automation, Computation and Control" by Grabbe, Ramo and Woolridge, published by John Wiley and Sons, 1959, or Chapter 20 of "Digital Computer and Control Engineering" by Robert S. Ledley, published by McGraw-Hill Book Company, Inc., 1960.

In the drawings, an "and" gate is indicated by a box with sides tapering to a point. The inputs are indicated as applied to the sides of the box and the output is taken at the point. The "and" gate output is normally at one level and changes to the other level when and only when all inputs are present at the same time. For convenience, the one level may be a relatively high, positive level, representing a binary "1" digit. When any one of the inputs is absent represented by a relatively low level, the "and" gate output is correspondingly low, representing a binary "0" output.

An "or" gate is indicated in the drawing by a straight line having two or more arrows on one side representing inputs and a single output line on the opposite side. The "or" gate output is normally at one level, say at zero, when all the inputs represent binary zero, and changes to the "one" level when any one or more of the inputs represent a binary "one."

An inverter circuit, represented in the drawings by a circle containing a capital I, serves to change a received high or low level representing a binary "1" or a binary "0" to a corresponding low or high level output representing a binary "0" or a binary "1," respectively.

The flip-flop units also are described in the above-mentioned textbooks. In the drawing a flip-flop is represented by a rectangular block having two inputs and two outputs. Each flip-flop has set (S) and reset (R) inputs and corresponding "1" and "0" outputs. When the flip-flop is set its "1," output is high relative to the "0" output, and when it is reset, its "0" output is high relative to its "1" output.

Various decoder units are employed and each may be a one-out-of many type matrix decoder of known, suitable design. A suitable decoder may be a diode decoder having $n$ input pairs and $2^n$ outputs. See, for example, Chapter 17 of the above-mentioned Ledley text.

Storage registers are also employed. Each storage register has a group of 18 flip-flops with separate flip-flops being used for each separate one of $n$ binary digits. These registers are also of known design.

Binary counting circuits of conventional design are also used. See, for example, Chapter 18 of the Grabbe et al. text. Each counter has a group of flip-flops interconnected to perform the binary counting function. The counter flip-flops have set, reset and corresponding "1" and "0" outputs and also have a trigger input. A signal applied to the trigger input causes a flip-flop to change from its present state to the opposite state. The trigger input of the counter is used to increment the value stored in the counter one unit.

A binary adder unit also is used which functions to add two binary numbers and to produce their sum. Suitable adder units also are described in Chapter 18 of the Grabbe et al. textbook.

A comparator unit which provides a relatively high output signal when two equal binary input numbers are applied to its inputs is also used. A suitable equality comparator is known. See, for example, Chapter 5, of the Ledley text.

A random-access memory is employed to store instructions, data and elementary operations. Suitable random-access magnetic memories are known. See, for example, Chapter 19 of the Grabbe et al. text.

ABBREVIATIONS

The following abbreviations are used in describing the arrangement and operation of the system of FIGURE 3.

ACC—ACCumulator
AEC—Address with Elementary Counter
AIC—Address with Instruction Counter
AXC—Address with X Counter
AYC—Address with Y Counter
AZC—Address with Z Counter
EC—Elementary Counter
EO—Elementary Operation
EOC—Elementary Operation Class
EOR—Elementary Operation Register
EXEO—EXecute Elementary Operation
IC—Instruction Counter
INC—INstruction Class
IR—Instruction Register
OPR—OPerand Register
REP—REset Pulse
RFEO—Read First Elementary Operation
RIP—Read In Pulse
RNEO—Read Next Elementary Operation
RNIN—Read Next INstruction
ROP—Read Out Pulse
RXA—Retrieve X Address
RYA—Retrieve Y Address
RZA—Retrieve Z Address
MW—Memory unit Write
MR—Memory unit Read
ST—STart
TEC—Trigger Elementary Counter
TIC—Trigger Instruction Counter
TP—Time Pulse
TXC—Trigger X Counter
TYC—Trigger Y Counter
TZC—Trigger Z Counter
XC—X Counter
YC—Y Counter
ZC—Z Counter
GFEO—Generate First Elementary Operation
GINI—Generate First Instruction
G0—Gate Zeroth word of Instruction
G1—Gate First word of Instruction
G2—Gate Second word of Instruction
G3—Gate Third word of Instruction
CMA—Control Module Active
MEO—Most Significant Elementary Operation Word
LEO—Least Significant Elementary Operation Word

DESCRIPTION OF FIGURE 1 SYSTEM

Figure 1:
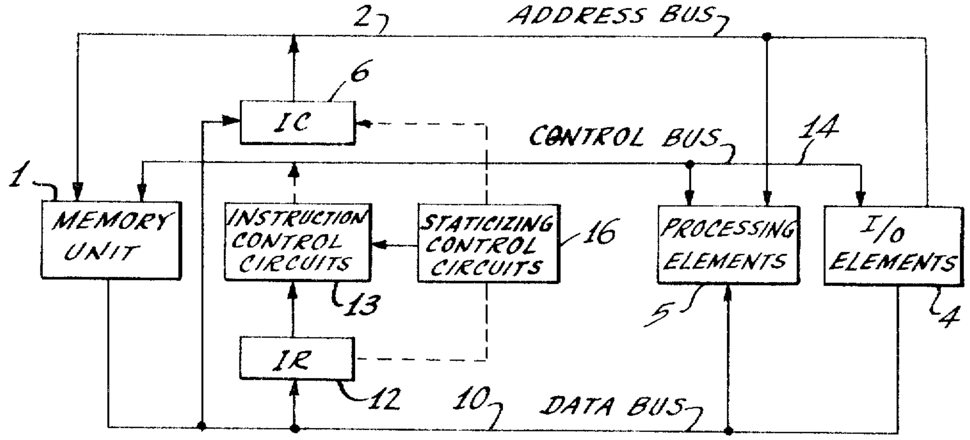
FIGURE 1 is a generalized block diagram of an arrangement of a prior art data processing system.

FIGURE 1 is a generalized block diagram of an arrangement of a stored program processing system according to the prior art. The system has a memory unit 1 for storing instructions and data. Memory address signals are applied to the memory unit via an address bus 2. The memory addresses may be sent from input-output (I/O) elements 4, processing elements 5, or an instruction control (IC) counter 6. A data bus 10 is coupled between the memory unit 1, the input-output elements 4, the processing elements 5, and an instruction register (IR) 12.

The operation of the units is controlled by instruction control circuits 13 which apply signals to a control bus 14 connected between the memory unit 1, the input-output elements 4, and the processing elements 5. A set of staticizing control circuits 16 are used to sequence instructions in the instruction control counter 6, the instruction register 12, and the instruction control circuits 13. As discussed above, the instruction control circuits comprise a set of interconnected gating, flip-flop and switching circuits which are wired to sequence in a predetermined manner the instructions called for by the program.

DESCRIPTION OF FIGURE 2 SYSTEM

Figure 2:
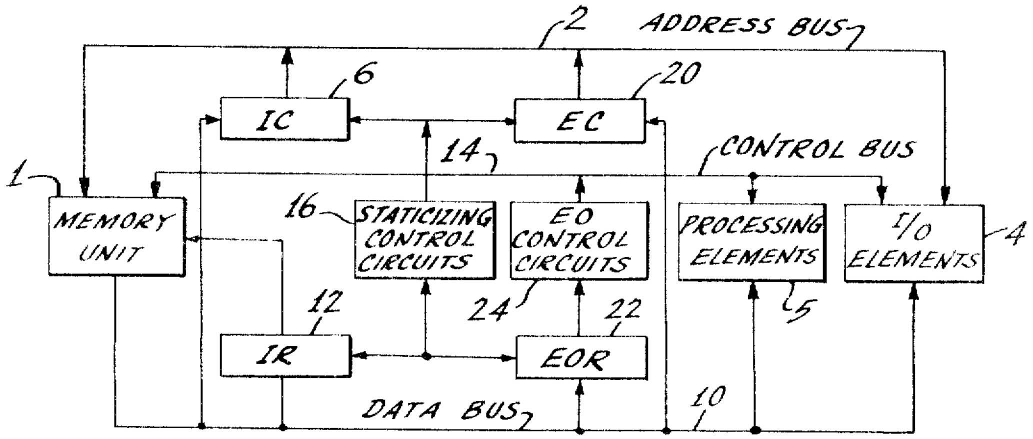
FIGURE 2 is a generalized block diagram of a data processing system according to the present invention.

FIGURE 2 is a schematic diagram of a system according to the present invention. Similar reference numerals are used to designate similar units.

A circuit 20 such as an elementary control counter (EC) 20 is used for sequencing elementary operations from the memory unit. Elementary operations are applied from data bus 10 to an elementary operation register (EOR) 22. Elementary operation (EO) control circuits 24 respond to each elementary operation to control the machine steps used in executing an instruction. The wired instruction control circuits 13 of FIGURE 1 are not required because the sequence of sub-operation of an instruction are determined by the stored format of elementary operation words in the memory unit 1. The control circuits 24, therefore, are much less complicated than in the case of the instruction control circuits 13 of FIGURE 1.

Further, the system of FIGURE 2 provides increased flexibility over that of FIGURE 1 because the coded elementary operation words in memory 1 are relatively easily changed by clearing the previously stored set of elementary operations, and writing a new set into the memory.

DESCRIPTION OF FIGURE 3 (GENERAL)

A more detailed diagram of the system of FIGURE 2 is shown in FIGURE 3 (FIGURES 3A, 3B, 3C and 3D). In the arrangement of FIGURE 3 the various functional units are enclosed in dotted blocks and identified by the same reference numeral as in FIGURE 2. However, it is understood that in some cases the placement of certain elements in one or the other of the functional blocks is a matter of convenience since its operation may involve one or more of the functions. Also for convenience of drawing and description, the arrangement is simplified in that the timing and operating pulses are idealized as perfectly rectangular pulses, and delay elements which, in practice, may be incorporated at various points in the system to compensate for pulse propagation times and varying operation times of the elements are not shown. This type of compensating delay element is well known in the art.

The memory unit 1 (FIGURE 3A) may be a random-access, magnetic core memory which receives or transmits data from and to the data bus 10. The memory location for the data is designated by a group of memory address signals applied to the address bus 2.

During a write cycle, the memory is controlled by a memory write (MW) flip-flop 26. During a read operation the memory is controlled by a memory read (MR) flip-flop 28.

Information is transferred from the memory to the data bus 10 via a set of eighteen memory input gates 30, and from the data bus to the memory by set of eighteen memory output gates 32.

Each counter and register unit is provided with a set of input and output gates for controlling entry and exit of information to and from the unit. The instruction counter (IC) 6 is a fifteen stage, binary counter which has a trigger input T for incrementing it by one unit each time a TIC pulse is applied to the trigger input. A fifteen bit address code is sufficient to uniquely identify 32,000 words stored in memory unit 1. The IC counter 6 delivers an address to address bus 2 via a first set of fifteen output gates 33, and to the data bus 10 via a second set of fifteen output gates 34. The IC (instruction counter) 6 receives information from the data bus 10 by way of a set of fifteen input gates 35, and is reset via a reset gate 36 whose output is connected to a common reset input for the counter.

The EC (elementary counter) 20 is a twelve stage counter incremented by a TEC pulse applied to its trigger input (T). This counter transmits data to the address bus 2 via a first set of twelve output gates 38, and transmits information to the data bus 10 via a second set of fifteen output gates 39. The EC 20 receives information from the data bus 10 by way of a set of fifteen input gates 40, and is reset by way of a reset gate 41 whose output is connected to a common reset input.

The IC 6 and EC 20 are enabled to received information from data bus 10 by way of R1 and R2 decoders 42 and 44, respectively, which are controlled by signals appearing on the control bus 14.

The IR (instruction register) 12 (FIGURE 3C) transmits address signals to the address bus 2 by way of a set of six output gates 46. A class digit D1 (bits 0–2 stored in the stages $2^0$–$2^2$ of IR 12) is sensed by code recognition circuits 48 and 49. The recognition circuit 48 provides an output level EOC when an elementary operation word is stored in the IR, and recognition circuit 49 provides an output INC level when an instruction word is stored in IR 12. The instruction register 12 receives data from data bus 10 via a set of eighteen input gates 50, and is reset by a reset gate 51 whose output is connected to a common reset input of the register.

The EOR (elementary operation register) 22 is an eighteen stage register which receives a word from bus 10 via a set of eighteen input gates 52. The EOR 22 transmits data to the data bus 10 via a set of twelve output gates 53. The register 22 is reset by a reset gate 54 whose output is connected to a common reset terminal. Control digits D4 and D5 of the EOR 22 are applied to a set of six input gates 56 of the staticizing control circuits 16.

STATICIZING CONTROL CIRCUITS 16

The staticizing control circuits 16 include an address decoder 58 and a recognition circuit 28 which control a set of five gates 61–65 used to generate trigger input signals to the various counters. The five gates 61–65 are designated by the name of the counter with which they are associated, viz TXC, TYC, TZC, TEC and TIC, respectively. The decoder 58 senses the address digit D5 of an EO and generates an enabling level corresponding to the counter specified by this digit. The five levels generated by decoder 58 are identified by the counters with which they are associated. As described later, these levels are used in gating addresses to the address bus 10. The AEC and AIC levels are also generated by operation retrieval levels to be discussed later. These operation retrieval levels are coupled by way of "or" circuits to the TEC and TIC gates.

A set of gates 68, 70 and 74 are used for generating control levels ROP, RIP and REP, respectively. These control levels are used during reading to and from the memory unit 1, in enabling the gates of the staticizing counters XC, YC and ZC, and in the processing circuits 5. The ROP gate 68 is enabled by an EO2 level. The RIP and REP gates 70 and 74 are enabled by various ones of the elementary operation levels, and operation retrieval levels which are applied through "or" circuits 72 and 76, respectively.

The three address staticizing levels RXA, RYA and RZA are coupled to the R3, R4 and R5 code generators (or encoders) 77, 78 and 79, respectively. Each of these generators applies to control bus 14, a three bit binary code which identifies the corresponding X, Y and Z counter. (A three bit code is sufficient to identify each of the seven counters and registers coupled to the control bus 14.) The EC 20 is identified by a three bit code generated by code generator 80. The generator 80 is enabled by the RFEO(1) elementral control level or the output of an "and" gate 82. This gate is enabled by the EO3 level and by a data dependent signal $X \neq Y$. The data dependent signal for gate 82, in this instance, is received from an inverter circuit 83 connected to the output of comparator unit 84 in the processing circuits 5. The comparator output is normally low except when the contents of the XC and YC counters are identical when it changes to a high value. The inverter 83 changes the normal low signal to a high signal normally enabling the "and" gate 82.

The outputs of the control gates 68, 70, 74 and code generators R2, R3, R4 and R5 of the staticizing circuits 16 are applied to the control bus 14. The various codes each designate one of counters and are decoded by corresponding one of the decoder units R1, R2, R3, R4 and R5 which are coupled to the control bus 14.

The R1 code designates IC 6, the R2 code designates the EC 20, and the R3, R4 and R5 codes designate the counters XC, YC and ZC, respectively. The R6 and R7 codes designate the operand register and accumulator of the adder unit.

Gate 86 serves to gate the control digits D2 and D3 from the EOR register 22 to the control bus 14. The gate 86 is enabled by an EXEO(1) level from the EO control circuits 24 and is inhibited by the output from inverter 87. The inverter 87 output is high except when EO3 and EO4 levels are present.

It is understood that, if desired, the various code generators R3, R4 and R5 can be replaced by a single encoding unit, and the various decoders R1–R7 can be replaced by a single decoder unit.

EO CONTROL CIRCUITS 24 (FIGURE 3C)

These circuits are used for generating control levels used in selecting and executing different ones of the elementary operations. The EO operation digit D6 (bits 15–17) from the EOR 22 is applied to a set of three "and" gates 90 whose outputs are decoded by EO operations decoder 92 into a corresponding one of the five EO levels EO0, EO1, EO2, EO3 and EO4. The execution of the EO's is initiated by EXEO flip-flop 94 which generates the EXEO(1) level at its "1" output. The flip-flop is controlled by a prime flip-flop PEX 96. The flip-flop 96 is set by various ones of the operation retrieval levels and in certain instances by the EO levels themselves by way of "and" gates 98 and 99. The output of "and" gate 98 sets the PEX flip-flop 96 when an elementary operation is to be executed.

THE STATICIZING COUNTERS (FIGURE 3B)

As described above, the invention is exemplified in connection with a three-address type system and, accordingly, three staticizing counters XC, YC and ZC are used. Each of these counters has eighteen flip-flops and can be incremented by one unit by a trigger pulse. A first set of output gates 100, 101 and 102, respectively, couple the contents of XC, YC and ZC to the address bus 2, and a second set of output gates 103, 105 and 107, respectively, couple the contents of these counters to the data bus 10. Common reset gates 108, 109 and 110 are used to reset the counters under the control of the REP level and the outputs of decoder units R3, R4 and R5, respectively. The three counters are coupled to the data bus 10 via three sets of input gates 111, 112 and 113, respectively, under the control of the RIP level and the outputs of decoder units R3, R4 and R5.

If desired, the binary counters can be replaced by registers by using a separate incrementer unit (not shown) coupled between address bus 2 and data bus 10. Each time a counter is connected to the address bus it is also connected to the incrementer unit. The count is then incremented or not as required and returned to the transferring counter.

PROCESSING CIRCUITS 5 (FIGURE 3D)

The adder 116 may be an eighteen bit, parallel binary adder which receives one operand at one input from an eighteen stage operand register (OPR) 118. For convenience, various shifting and overflow circuits which may be used with the adder unit are not shown.

Information is gated to OPR 118 from data bus 10 by way of a set of "and" gates 120 enabled by the RIP level and the output of the R6 decoder. A common reset is applied to OPR 118 by way of "and" gate 122 controlled by RIP level and the R6 decoder.

The second operand is applied to the second input of adder 116 from an eighteen stage accumulator unit (ACC) 124. A set of eighteen "and" gates 126 connects the accumulator to the adder under the control of the REP level and the decoder R6. The accumulator register is also connected to the data bus 10 by way of a set of eighteen "and" gates 128 under the control of the ROP level and the R7 decoder.

A common reset input of the accumulator is coupled to the output of a first reset "and" gate 130 controlled by the REP level and the R7 decoder, and a second reset "and" gate 132 controlled by the R6 decoder. The accumulator 124 receives information from either the data bus 10 by way of a set of "and" gates 136 or from the adder unit 116 by way of a set of "and" gates 138. The first accumulator input gates are controlled by the RIP level and R7 decoder. The second accumulator input gates 138 are controlled by an add flip-flop (AD) 140. The flip-flop 140 is set by the output from "and" gate 142 which is controlled by the R6 decoder.

The comparator unit 84 receives the output of the XC counter at a first input and the output of the YC counter at a second input. The single output is a high level when the two inputs are identical.

OPERATION RETRIEVAL CIRCUITS (FIGURE 4)

The generating circuits for the operation levels used in obtaining instruction and elementary operation words from the memory unit are shown in FIGURE 4. The retrieve next instruction level (RNIN(1)) is generated by a pair of flip-flops 150, 152. An RNIN flip-flop 150 has its set and reset inputs coupled to the "1" and "0" outputs of a start flip-flop (ST) 152. This flip-flop is set by various ones of the elementary operation levels and by a start signal generated externally as by pushbutton 154. When closed the pushbutton activates a pulse generator 156 which applies an input pulse to the set input of the start flip-flop. A first set "and" gate 158 is used to gate the start pulse to the flip-flop. Second and third set "and" gates 160 and 162 combine two different groups of elementary operation control levels and apply a set signal to the ST flip-flop when these control levels are present. The ST flip-flop is reset by a reset "and" gate 164. The RNIN(1) level is used to generate the staticizing levels RXA, RYA and RZA for the X, Y and Z counters, and the first elementary operation level RFEO(1). The three addresses used with an instruction are read in sequence from the memory to the XC, YC and ZC under the control of the RXA, RYA and RZA flip-flops which are connected in cascade arrangement. The RXA level is generated by a pair of flip-flops comprising a RXA flip-flop 170 and a prime flip-flop X. The "1" and "0" outputs of the X flip-flop are coupled to the set and reset inputs of the RXA flip-flop 170. The X flip-flop is set by the output of "and" gate 174 under the control of the RNIN(1) level and the output of code recognition circuit 49 (FIGURE 3C).

The RYA(1) and RZA(1) levels are generated by pairs of flip-flops Y,RYA and Z,RZA. The Y prime flip-flop is set by the output of "and" gate 176 under the control of the RXA(1) level. The Z prime flip-flop is set by the output of "and" gate 178 under the control of the RYA(1) level.

A pair of flip-flops F and RFEO are used to generate the RFEO(1) level. The F flip-flop is set by the output of "and" gate 180 under the control of the RZA(1) level.

An RI level is provided by the output of "or" circuit 182 which receives as inputs the RNIN(1), RXA(1), RYA(1) and RZA(1) levels.

A pair of flip-flops NEO, RNEO are used to generate the RNEO(1) level. The NEO flip-flop is set by either a first set "and" gate 184 under the control of the RFEO(1) level, or a second set "and" gate 186 under the control of the EXEO(1) level of the EO control circuits 24 (FIGURE 3C), and the INC level from recognition gate 49 (FIGURE 3C). The second set gate 186 is blocked during the presence of the EO0 and EO4 levels. These signals are received from operations decoder 92 of the EO control circuits 24 (FIGURE 3C). Inverter 190 changes a high EO0 or EO4 level to a low level to block the set gate 186.

TIMING PULSE GENERATOR AND TIMING PULSE CYCLE (FIGURES 5 and 6)

Timing pulses are generated in a ring counter 192 which receives input pulses from an oscillator circuit 194. The counter is provided with six stages for generating six separate timing pulses. Each oscillator pulse applied to the trigger input T advances the counter by one stage and a new timing pulse is generated. The counter cycles after each six input pulses.

The timing diagram of FIGURE 6 indicates the relation between the oscillator pulses and the successive timing pulses T1–T6. A timing pulse, for example, T1 is generated by the leading edge of the next succeeding clock pulse. These timing pulses are used to activate the various "and" gate circuits of the system of FIGURE 3 and the operation retrieval circuits of FIGURE 4.

It is understood that in an asynchronous type machine a timing pulse generator need not be employed, but rather return signals from various functional units may be used to activate successive machine step signals. And, in other system arrangements, these return signals together with locally generated timing signals may be used to initiate operation of various ones of the functional units.

SYSTEM OPERATION

The system operation is illustrated by describing the performance of a simple program. It is understood that although the program is entirely typical, it is also greatly simplified and that in actual practice many more instructions and elementary operations would be available. The operating program consists of adding a constant stored in one address in the memory to an operand stored in a second memory address to obtain a first sum. The first sum is then added to a third operand in another memory location to obtain a final sum. The final sum is stored in a fourth memory location in the memory work area. The final sum is then transferred by a sector transfer operation from the work area to a memory write-out area, and the computer is stopped.

FIGURE 7 is a flow diagram illustrating the steps in this typical program and the instructions and elementary operations used during its execution. The first step of the program is represented by block A. The operand in a memory location M is added to a constant (1) using instruction (IN2). During EO1 (block B) the present contents of the accumulator (ACC) are added to the third operand N and returned to the accumulator. During EO2 (block C) the contents of the accumulator are transferred to the memory work area. The next step in the program is indicated by block D. The transfer from the work area to the write-out area uses a sector transfer operation IN1. The final step is to stop the computer using elementary operation EO0 (block E).

MEMORY CONTENTS (FIGURES 8 and 9)

FIGURE 8 is a chart of memory locations shown in the left column, and their contents shown in the right column, which are used during the program.

FIGURE 9 is a chart of the work and write-out areas of the memory. The memory locations are numbered in octal notation and are indicated in the left-most column. Succeeding columns from the left indicate the initial contents of these locations and the changes occurring during various steps of the program.

Referring to FIGURE 8, the initial instruction for the program is stored in memory location or address 200 and successive instructions and elementary operation words of the program are stored in successive locations beginning at 201.

Storage locations between 0 and 100 are used to store a table of initial address of the respective sequences of elementary operations used in executing the various instructions. Memory storage locations between 100 and 200 store the elementary operation sequences.

The first instruction word of the program designates an add operation and is stored at location 200. The contents of the next three locations 201, 202 and 203 are to be stored in the counters XC, YC and ZC as the computer is assumed to be operating in the three-address mode. The contents of locations 201 and 202 refer to two other memory addresses which store the two operands, and the contents of location 203 refers to the storage location of the final sum.

OPERATION RETRIEVAL FLOW DIAGRAM (FIGURE 10)

Blocks A through G of FIGURE 10 illustrate the sequencing of the operation retrieval control circuits of FIGURE 4. The start pulse initiates the retrieval of the first instruction at the memory location specified by the contents of the instruction counter (*s*IC). This instruction is transferred to the instruction register. If the word retrieved is an elementary operation word, it is also transferred to the elementary operation register. The instruction counter is then incremented.

Blocks B, C and D illustrate the staticizing of the counters XC, YC and ZC using the contents of the instruction counter to address the memory.

The next step is the retrieval of the first elementary operation (block E) by addressing the memory with the contents of the instruction counter (*s*IR).

The next step is the retrieval of the next succeeding elementary operation (block F) by addressing the memory with the contents of the elementary operations counter (*s*EC).

The next step is the execution of the retrieved elementary operation (block G) using the elementary operation register.

From block G, the next instruction is retrieved provided EO4 is specified, otherwise the next elementary operation is retrieved except when the EO0 (stop operation) is specified.

MEMORY TIMING DIAGRAM (FIGURE 11)

FIGURE 11 is a timing diagram illustrating the relation between the memory timing during a read and write cycle and the timing pulses T1 through T6 of a machine cycle. During timing pulse T1 of a cycle using the memory one of levels MR(1) or MW(1) is generated, and the address digits used to specify the memory address are gated to the address bus 2. These address digits specify the memory location to be read from or written into. During timing pulse T3 in a write cycle the data is gated from the data bus 10 to the memory input by way of the set of memory input gates 32 which are activated by the ROP pulse. Any information in the memory location to be written into is erased or cleared between the times T1 and T3.

During timing pulse T4 in a read cycle the data is gated from the specified memory location to the data bus 10 via the set of output gates 30 which are enabled at this time by the RIP pulse. Between times T4 and T6 the information read from the memory location is regenerated and returned to the same location. Timing pulse T6 resets the MR and MW flip-flops removing the MR1 and MW1 levels.

Thus, during a read operation the data is transferred from the memory to the data bus during timing pulse T4.

During a write operation the data is transferred from the data bus to the memory during timing pulse T3.

PROGRAM OPERATION

*Retrieve instruction and XC, YC and ZC addresses*

The address 200 of the first instruction IN2 of the program is inserted into the instruction counter 6 by any suitable means, for example, paper tape via the input-output elements 4, or setting of manual switches on a console unit (not shown). A general reset pulse may be applied to all the counters and registers prior to the start of the program.

The various levels used during this phase of the program are generated by the operation retrieval circuits of FIGURE 4. The start button 154 is pressed and the ST flip-flop (FIGURE 4) is set via a set "and" gate during timing pulse T3. During timing pulse T6 the RNIN(1) level is generated.

The RNIN(1) level generates the RI level which in turn enables the MR flip-flop set "and" gate (FIGURE 3A), and generates the AIC level (FIGURE 3C) which enables the first set of output gates 33 of the instruction counter 6. The RI level also is used to generate the RIP pulse in the staticizing control circuits 16 (FIGURE 3C). The RIP pulse is used to enable the output gates 30 of the memory. During timing pulse T1 of the next cycle the instruction counter 6 address is gated to address bus 2 and memory location 200 is specified. During timing pulse T2, the AIC gate is active and the IC 6 is increased by one to specify location 201.

The memory is in a read cycle and during timing pulse T4, the RIP pulse is generated and the data stored in address 200 is gated via the memory output gates 30 to the data bus 10 and is passed to instruction register 12 via the input gates 50.

Timing pulse T6 of the cycle resets the MR flip-flop 28. The class digit D1 of the instruction gated to IR 12 is "0" and is sensed by code recognition gate 49 producing the INC level. During timing pulse T4, the INC level sets the X flip-flop of the operation retrieval circuits (FIGURE 4) and timing pulse T6 of the cycle sets the RXA flip-flop to generate the RXA(1) level. This level maintains the RI level high. Timing pulse T6 resets the RNIN flip-flop.

During the next cycle, the memory is addressed by the contents of the instruction counter 6 in a similar manner and the contents of memory location 201 (which specify memory address 203) appear on the data bus 10 at time T4. The RXA(1) level activates R3 code generator of the staticizing circuits 16 and the R3 code is applied to the control bus 14 to activate the R3 decoder. The data appearing on bus 10 at time T4 is gated to XC via the set input gates 111 which are enabled by the R3 level and the RIP pulse. The IC 6 is again incremented and now stores address 202.

During timing pulses T4 and T6 of the next cycle the pair of Y counters of the retrieval circuits are set to generate the RYA(1) level and the RXA(1) level is removed. During the next timing cycle the RYA(1) level activates the R4 code generator of the staticizing circuits 16 and the contents of the memory location 202 (in this case memory address 301) appear on data bus 10 at time T4 and are gated to the YC counter by the set input gates 112. These gates are activated by the output of R4 decoder 90 and the RIP pulse. The IC 6 is again incremented and now stores address 203. Timing pulse T4 also sets the Z flip-flop of the retrieval circuits (FIGURE 4). Timing pulse T6 resets the RYA flip-flop and sets the RZA flip-flop.

The RZA(1) continues the RI level causing the instruction counter 6 to be again incremented during timing pulse T2 to address memory location 204. The RZA(1) level activates the R5 generator of the staticizing circuits 16 to designate counter ZC. During timing pulse T4 the contents of memory address 203 appear on bus 10 and are gated to the ZC by the set input gates 113. These gates are enabled by the output of the R5 decoder and the RIP pulse. The IC counter 6 is again incremented during timing pulse T2 and now stores address 204. Timing pulse T4 sets the F flip-flop of the retrieval circuits. Timing pulse T6 resets the RZA flip-flop and sets the RFEO flip-flop to generate the RFEO(1) level.

Thus, at the end of the first four timing cycles the operation word is stored in the instruction register 12 and the three memory addresses designating the two operands and the storage location of the result are stored in XC, YC and ZC. The INC level remains high.

PERFORM FIRST ADDITION (PROGRAM STEP A)

*(a) Retrieve address of first elementary operation*

Control of the machine operation is now transferred from the instruction counter 6 to the elementary operation counter 20. The next sequence of machine operations involves the retrieval from the memory and the execution of the various elementary operations used in implementing the machine steps required to perform the add operation. The RFEO(1) level from the operation retrieval circuits, initiates a memory read cycle (FIGURE 3A). The RFEO(1) level enables the output gates 46 of the instruction register 12 and the operation digits D5, D6 (bits 12–17) specified by the instruction word are gated to the memory address bus 2 during timing pulse T1. In the present case, the operation digits are 02 designating the add operation. These digits also specify an address in the EO interpretive routine table in the memory, in this case, memory location 2 (FIGURE 8).

The contents of this location specify the address of the first elementary operation in the EO routine used in the execution of the add operation (memory location 106).

The RFEO(1) level also activates the R2 code generator of the staticizing circuits 16. The R2 code is applied to the control bus 14 to activate the R2 decoder to enable the set input gates 40 of EC 20 (FIGURE 3A). The RFEO(1) level also enables RIP gate 70 of the staticizing circuits 16. This gate generates RIP pulse to enable the EC 20 set gates 40.

During timing pulse T4 the memory output appears on data bus 10 and is gated to EC 20 via enabled set input gates 40. At the end of this timing cycle the address 106 is now stored in EC 20.

In the operation retrieval circuits (FIGURE 4) the RFEO(1) level sets the NEO flip-flop via gate 184 during timing pulse T4. During timing pulse T6 the RNEO flip-flop is set generating the RNEO(1) level, and the RFEO flip-flop is reset terminating the RFEO(1) level. The RNEO(1) level generates the AEC level in the staticizing circuits 16 (FIGURE 3C) to enable the output gates 38 of the EC counter 20. The RNEO(1) level also initiates a memory read cycle.

*(b) Retrieve first elementary operation*

During timing pulse T1 the signals specifying address 106 are gated to the address bus from EC 20 (FIGURE 3A). During timing pulse T2 the EOR 22 (FIGURE 3C) is reset by way of reset gate 54 which is enabled by the RNEO(1) level. This level also enables the input gates 52 to the same register. Timing pulse T2 also generates a TEC pulse from TEC gate 64 to increment the EC counter 20 by one. This counter now stores address 107.

During timing pulse T4 the data address 106 appears on data bus 10 by way of memory output gates 30 and is gated to EOR 22. In the EO control circuits 24 the RFEO(1) level enables the input gate to the PEX flip-flop 80. This flip-flop is set during T4, and during T6 the EXEO flip-flop is set generating the EXEO(1) level (execute EO). The EXEO(1) level enables the decoder input gates 56 and the address gates 86 of the staticizing circuits 16, and the decoder input gates 90 of the EO control circuits 24.

As indicated in FIGURE 8 the contents of memory location 106, now stored in EOR 22, in an elementary operation word ($D1=7$) 137077. The operation digit D6 is 1 which specifies elementary operation EO1 which is used in setting a register. The next digit D5 specifies the counter (in this instance the X counter) which contains the storage address of the word which is to be placed in the receiving register. The receiving register is specified by the digits D3 and D2 (in this instance the accumulator). Digit D4 is either 0 or 7. When D4 is a 7 it specifies that the transferring register is to be incremented by one unit.

In the EO control circuits 24 (FIGURE 3C) the EXEO(1) level gates digit D5 (bits 15–17) to the EO decoder 92 which generates the EO1 level. In the staticizing circuits 16, digit D5 (bits 12–14) is gated to the register decoder 202 which generates the AXC level. Digit D4 (bits 9–11) is gated to recognition circuit 28 which provides a high output when $D4=7$ to enable the counter trigger gates 61–65. The EO1 level also enables the REP and RIP gates and initiates a memory read cycle.

*(c) Execute first elementary operation*

During timing pulse T1 the contents of the X counter are gated to the address bus 2. In the present example, the X counter is addressing memory location 213 (FIGURE 8) which contains the constant to be added in this example octal 1. During timing pulse T2, the TXC gate of the staticizing circuits 16 is activated to generate the TXC pulse which increments the X counter by one unit.

Digits D2 and D3 (bits 3–8) from the EO register 22 are gated to the control bus 14 and designate the accumulator. The R7 decoder in the arithmetic unit (FIGURE 3D) thereby produces an output to enable the reset gate 130 and the first input gates 136 of the accumulator. The second input to the reset gate 130 is enabled by the REP pulse, and the second inputs of gates 136 are enabled by the RIP pulse. Thus, during the timing pulse T2 the accumulator is reset, and during timing pulse T4 the data is transferred from bus 10 to the accumulator 124.

In the operation retrieval circuits (FIGURE 4) the NEO flip-flop is set during timing pulse T4 via the second set "and" gate 186 which is enabled by the EXEO(1) and INC levels. During timing pulse T6 the RNEO(1) level is generated. In the staticizing circuits 16 (FIGURE 3C) this level enables the RIP gate, and in the EO control circuits 24 enables the set input gate 98 of the PEX flip-flop.

In the staticizing circuits 16 the RNEO(1) level generates the AEC level and enables the TEC gate 64. Thus, at the end of EO1, the constant is transferred to the accumulator. The next elementary operation at location 107 is to be retrieved and then executed.

*(d) Retrieve second elementary operation*

During timing pulse T1 the contents (address 107) of EC 20 are gated to the address bus 2 and a memory read cycle is initiated. In the EO control circuits (FIGURE 3C) the PEX flip-flop is reset during time T2 and set during time T4. In the staticizing circuits 16 the RIP gate is enabled. During timing pulse T2 the TEC pulse is generated advancing EO counter 20 to address 108. During timing pulse T4 the contents of memory location 107 are read out to the data bus 10 and gated to the EOR register 22. This register was reset during timing pulse T2.

As indicated in FIGURE 8 the contents of memory location 107 is a second set register elementary operation (EO1) 140767. Digit D5 specifies the Y counter, digit D4 specifies that the Y counter is to be incremented, digits D3 and D2 specify the operand register. This elementary operation is now stored in the EO register 22. During timing pulse T6 of the retrieval cycle the EXEO(1) level is generated enabling address gate 86. The gate 86 passes the R6 code representing the operand register to the control bus and the R6 decoder then enables the operand register reset gate 122, and set gates 120. The D6 digit is decoded by the operation decoder generating the EO1 level. Digit D5 is sensed by the address decoder 58 generating the AYC level, and digit D4 is decoded by recognition gate 28 enabling the TYC gate.

*(e) Execute second elementary operation*

During the next timing cycle the contents of the Y counter are gated to the address bus 2. In the present example the Y counter specifies memory location 301. As indicated in FIGURE 9, the contents of this location is octal 3. The EO1 level initiates a memory read cycle and enables the RIP gate of the staticizing circuits 16. During timing pulse T2 the Y counter is incremented by one unit and now specifies memory location 302. During timing pulse T4 the operand (octal 3) is gated to the data bus 10 and applied through the gates 120 to the operand register 118.

In the arithmetic unit, the R6 decoder output also enables the output gates of the accumulator 124 whose contents are applied during timing pulse T2 to the A1 input of the adder unit 16. Thus, beginning at time T4 the operand register contents are being added to the accumulator contents in the adder 116. The sum of these two numbers is provided at the adder output A2.

ARITHMETIC UNIT TIMING DIAGRAM (FIGURE 12)

FIGURE 12 is a timing diagram indicating the operation of the adder unit. During the previous timing cycle the first operand was gated to the accumulator. The operand remains in the accumulator until time T2 of the succeeding timing cycle. During timing pulse T6 of the previous cycle to EO1, EXEO(1) and R6 select signals are generated. These levels continue until timing pulse T6 of the present cycle. During timing pulse T2 of the present cycle, the accumulator contents are gated to the A1 input of the adder, the REP pulse is generated in the staticizing circuits 16, and the operand register is reset via gate 122. During timing pulse T4, the RIP pulse is generated and the new operand is gated into the operand register and applied to the second adder input, and the accumulator is reset via second reset gate 132. The adder then proceeds to generate the new sum. Also during timing pulse T4, the adder register 140 is set generating the AD1 level which enables the output gates of the adder.

During timing pulse T1 of the next cycle, the new sum is gated to the accumulator unit 124 and the following timing pulse T2 resets the adder register 140. Thus, during timing pulse T2 of the cycle following an add operation, the new sum is in the accumulator unit and available for transfer to some other unit. In the present example the accumulator unit is operating as a simple register.

*(f) Retrieve third elementary operation*

The elementary control counter EC 20 is now addressing memory location 110 (octal) since it was incremented by one unit from 107 (octal) during the previous cycle. In the operation retrieval circuits (FIGURE 4), the EXEO(1) and INC levels enable set gate 186 and the NEO flip-flop is set at time T4. During time T6 the RNEO flip-flop is set generating the RNEO(1) level. This level initiates a memory read cycle, and in the staticizing circuits 16 (FIGURE 3C) enables the TEC gate, the REP and the RIP gates.

During the RNEO cycle, at the time T1, the contents of EC 20 are gated to the address bus 2. The elementary counter 20 is incremented at time T2. During time T4 the RIP pulse is generated gating the contents of memory address 110 to the data bus 10 and the EOR register 22.

As indicated in FIGURE 8, this is an elementary operation word (EO2) (store register), and specifies that the contents of the accumulator are to be transferred to the memory location specified by the Z counter, and the Z counter is to be incremented by one.

In the EO control circuits 24 the PEX and EXEO flip-flops are set raising the EXEO(1) level. This level gates the operation digit D6 to the decoder 92 raising the EO2 level. The digit D5 is gated to the AR decoder 58 raising with AZC level. Digit D4 is sensed by recognition circuit 28 (FIGURE 3C) enabling the counter trigger gates. Digits D3 and D2 are transferred by gate 86 to the control bus 14 and the R7 decoder provides a high output level. The EO2 level also enables the REP gate of the staticizing circuits 16.

*(g) Execute third elementary operation*

The EO2 level initiates a memory write cycle during time T1. Timing pulse T1 gates the Z counter contents to the address bus 2. At this time the Z counter specifies memory location 304 (FIGURE 9). During timing pulse T3 the ROP pulse is generated which together with the R7 level gates the accumulator contents via output gate 108 to the data bus 10 and from the data bus 10 to memory location 304 via memory gates 132. As indicated in FIGURE 9 memory location 304 then stores the result of the first addition which is decimal 4. The Z counter is incremented by the TZC pulse generated at time T2. Thus, the Z counter now specifies memory location 305.

In the operation retrieval circuits (FIGURE 4), the set gate 186 is activated at time T4 to set the NEO flip-flop, and at time T6 the RNEO flip-flop is set generating the RNEO(1) level.

Note that the contents of the accumulator 124 have not been reset during this cycle and the previous sum remains stored in the accumulator.

*(c) Retrieve next elementary operation*

The RNEO(1) level enables the set and reset gates 52 and 54 of the EO register 22 (FIGURE 3C). In the staticizing circuits 16 the RNEO(1) level enables the TEC gate 64, and in the EO control circuits 24 the RNEO(1) level enables the set gate 98 of the PEX flip-flop.

At this time the elementary counter 20 is addressing memory location 111. During timing pulse T1, the contents of EC 20 are gated to the address bus 2 and a memory read cycle is initiated. During timing pulse T2 EC 20 is incremented by a TEC pulse and the EO register 22 is reset. During timing pulse T4 the RIP pulse is generated gating the contents of memory location 111 to EOR 22.

As indicated in FIGURE 8, this word is elementary operation word EO4 (retrieve next instruction) and is the final EO in the interpretive EO sequence for the three address add instruction. The EXEO(1) level is generated during the retrieval cycle, and the operation digit D6 (equal to 4) is applied to the operation decoder 92 generating the EO4 level. Elementary operation EO4 specifies that the next instruction of the program is to be retrieved. The EO4 level is inverted by inverter 89 of the staticizing circuits 16 to block the address register decoder gate 56 and the output gates 86.

In the operation retrieval circuits (FIGURE 4), the EO4 level is inverted by inverter 190 to block the set gate 186 of the NEO flip-flop. The EXEO(1) and EO4 levels enable the set gate 160 of the ST flip-flop.

PERFORM SECOND ADDITION (PROGRAM STEP B)

*(a) Retrieve next instruction*

During the following cycle, at time T2, the ST flip-flop is set. During time T6, the RNIN flip-flop is set generating the RNIN(1) and RI levels. At this time the instruction counter 6 is addressing memory location 204. The RNIN(1) level enables the set and reset gates of instruction register 12, and the set gate of the EO register 22 provided that an elementary operation is read out of the memory during the instruction retrieval cylcle, i.e., the EOC level appears. The RNIN(1) level also is an enabling input to the reset gate 54 of EOR 22 and to the set gate 99 of the PEX flip-flop.

During timing pulse T1 the contents of the instruction counter 6 are gated to the address bus 2 and a memory read cycle is initiated. During timing pulse T2, the instruction counter 6 is incremented, and the instruction register 12 and EOR 22 are reset.

During timing pulse T4 the RIP pulse is generated gating the contents of memory location 204 to data bus 10 and to the instruction register 12. As indicated in FIGURE 8, this memory location stores an EO1 (set register) operation. The class digit D1 is sensed by recognition circuit 48 generating the EOC level which enables the set gates of EOR 22 and the PEX flip-flop. Thus, during timing pulse T4 the word read from the memory is also gated to the elementary operation register 22 and the PEX flip-flop is set. During timing pulse T6 the EXEO flip-flop is set generating the EXEO(1) level.

The operation decoder senses the operation digit D6 to generate the EO1 level. This elementary operation specifies that the memory contents addressed by the Y counter are to be transferred to the operand register and that the Y counter is not to be incremented (digit D4=0). Digit D5 is sensed by address decoder 58 to generate the AYC level. Digit D4 is sensed by recognition circuit 28 (FIGURE 3C) and is it is "0" this circuit provides a low output blocking the counter gates 61–65.

*(b) Execute EO1*

The EO1 level initiates a memory read cycle. During timing pulse T1 the contents (302) of the Y counter are gated to address bus 2. Digits D2 and D3 from the EOR register 22 are passed by the gates 86 to control bus 14. The R6 decoder then enables the set and reset gates of the operand register and the output gates 126 of the accumulator. During timing pulse T2 the REP pulse is generated to reset the operand register. The contents of the accumulator are also gated via output gates 126 to the A1 input of the adder.

During timing pulse T4 the RIP pulse is generated getting the contents of memory location 302 to the data bus 10 and to the operand register 111. As indicated in FIGURE 9, the contents of this location is decimal 2. The adder unit then proceeds to add the previous accumulator contents with the contents of the operand register to produce a final octal sum 6.

In the operation retrieval circuits (FIGURE 4) the EXEO(1) and EOC levels enable the set gate 162 of the start flip-flop. This gate is also enabled via an inverter since the EO0 operation is not specified. Since at the present time the EOC level is high the set gate 186 of the NEO flip-flop is blocked.

During timing pulse T2 of the cycle the ST flip-flop is set and during timing pulse T6 the RNIN(1) level is generated. In the EO control circuits 24 (FIGURE 3C) the PEX flip-flop is reset by timing pulse T2, and the EXEO flip-flop is reset by timing pulse T6.

Note that the storage of EO1 in memory location 204 following the add instruction operates to perform a single address add instruction using the contents of the memory location addressed by the Z counter and the contents of the accumulator. Recall that during the add instruction the Z counter was incremented by one unit and the accumulator was not reset. This, then, is the equivalent of a single address operation using an assumed address (present contents of the Z counter) and illustrates the flexibility and program abbreviation possible using mixtures of instruction words and elementary words in the program routine.

The flexibility of the interpretive EO routine can also be illustrated at this time. For example, returning to FIGURE 8 the interpretive EO routine for the add instruction is illustrated as requiring four elementary operations in memory locations 106, 107, 110 and 111. However, in place of a store register elementary operation (EO2) in memory location 110, an EO4 operation could have been specified. In such case, the next step would have been the retrieval of the set register operation at memory location 204 and the contents of memory location 302 (octal 2) would have been added to the contents of of the accumulator to obtain the final sum. This flexibility in arranging different sequences of interpretive routines for carrying out instructions permits the programmer a much more flexible approach in specifying different instructions sequences especially when other functional units are added to or substituted in the original system complement.

STORE ACCUMULATOR CONTENTS IN MEMORY WORK AREA (PROGRAM STEP C)

(*a*) *Retrieve next elementary operation*

At this time IC 6 is addressing memory location 205. The RNIN(1) level generates the RI level which initiates a memory cycle, and in the staticizing circuits 16 enables RIP and REP gates. The reset gates of IR and EOR 12 and 22 are also enabled.

During timing pulse T1 of the next cycle the contents of the instruction counter 6 are gated to address bus 2. Also, at this time, the contents of the adder 116 are gated to the accumulator unit 124. During timing pulse T2 the instruction counter 6 is incremented by one unit. The REP pulse is also generated but none of the gates receiving it is enabled.

During timing pulse T4 the RIP pulse is generated and the contents of memory location (205) are gated to data bus 10 and to the instruction register 12.

In the present example, as indicated in FIGURE 8, the transferred data from location 205 is in an elementary operation word (250077). The class digit D1 (equal to 7) is sensed by recognition gate 48 generating the EOC level and causing the same data to be also entered into the elementary operation register 22 via set gates 52. The EOC level also causes the PEX flip-flop of the EO control circuits 24 to be set during time T4. During time T6 the EXEO(1) level is generated.

In the operation retrieval circuits (FIGURE 4) the ST flip-flop is reset at time T4 and the RNIN flip-flop is reset at time T6 terminating the RNIN(1) and RI levels. Again, the X flip-flop is not set due to the absence of the INC level.

The elementary operation word stored in register 22 defines a store register operation since its operation digit D6 is 2. This digit is sensed by operation decoder 92 (FIGURE 3C) generating the EO2 level. This level enables the ROP gate of the staticizing circuits 16. The EO2 level also initiates a memory write cycle. Digit D5 of the stored EO2 word specifies the Z counter. This digit is sensed by address decoder 58 (FIGURE 3C) of the staticizing circuits 16 and the AZC level is generated. Digit D4 is sensed by recognition gate 28 and in this case is a "0" so the TZC gate is not enabled.

Digits D3 and D2 (equal to 7) specify the accumulator. These digits are passed by gate 86 of the staticizing circuits 16 to the control bus 14 and are sensed by decoder R7 enabling the output gates 128 of the accumulator.

(*b*) *Execute EO2*

During timing pulse T1 the contents of the Z counter (location 305) are gated to the address bus 2. During timing pulse T3 the ROP pulse is generated activating the accumulator output gates 128 transferring its contents to the data bus 10. The ROP pulse also enables the memory input gates 32 transferring the data on bus 10 to memory location 305. During timing pulse T2 the PEX flip-flop of the EO control circuits 24 is reset, and during timing pulse T6 the EXEO flip-flop is reset terminating the EXEO(1) level.

In the retrieval circuits the ST flip-flop is again set during timing pulse T2 due to the absence of the EO0 level, and during timing pulse T6 the RNIN flip-flop is set generating the RNIN(1) and RI levels.

As indicated in FIGURE 9, at this time memory location 305 now stores the final sum (octal 6).

SECTOR TRANSFER (PROGRAM STEP D)

(*a*) *Retrieve next instruction*

At this time the instruction counter 6 is addressing memory location 206. As indicated in FIGURE 8 this location stores an instruction since its class digit D1 is 0. The operation digits D5 and D6 (equal to 1) specify a sector transfer operation. During T1 of the timing cycle this instruction is retrieved from memory and stored in the instruction register 12. The class digit (D1) is sensed by recognition circuit 49 generating the INC level. Hence, the set input gates 50 of the EO register 22 remain blocked preventing the instruction from reaching the EO register.

In the retrieval circuits (FIGURE 4) the INC level activates the input gate 174 to the X flip-flop and during timing pulse T4 of the retrieve instruction step the X flip-flop is set, and during timing pulse T6 the RXA(1) level and RI level are generated. The RI level enables the TIC gate of the staticizing circuits 16 causing the instruction counter 6 to be incremented at time T2. Hence, the instruction counter now addresses memory location 207.

The sector transfer is a normal instruction, hence, the memory addresses 209, 210 and 211 are interrogated in sequence and their contents transferred to the X, Y and Z counters as decsribed above in connection with the add instruction.

As indicated in FIGURE 8, the three counter addresses are at memory locations 305, 306 and 400. In this case, the X counter specifies the starting location of the field to be transferred, the Y counter specifies the last address of the field to be transferred, and the Z counter specifies the first address to which the field is to be transferred.

Following the transfer of the contents of memory location 211 of the Z counter, the RFEO(1) level of the retrieval circuits is generated and the instruction counter 6 is now addressing memory location 212.

(*b*) *Retrieve first elementary operation*

The RFEO(1) level activates the output gates 46 of the instruction register 12 gating the operation digits D5 and D6 to the address bus 2 at time T1. These digits specify memory location 1 which contains the first address of the elementary operation sequence used in executing the sector transfer operation. As indicated in FIGURE 1, this first address is stored at memory location 100. The RFEO memory also generates a memory read cycle and enables the RIP gate of the staticizing circuit and also enables the code generator R2 of the control circuits. The code designating the elementary counter 20 is applied to the control bus 14 and sensed by decoder R2 activating the input gates 40, 41 of EC 20. During timing pulse T2 the REP pulse is generated activating reset gate 41 to reset EC 20. During timing pulse T4 the RIP pulse is generated and the data is transferred from the memory to data bus 10, and via input gates 40 to the elementary counter 20. The address of the first elementary operation of the sequence used in executing the sector transfer instruction is then stored in EC 20. In the retrieval circuits the RFEO(1) level is terminated at time T6 and the RNEO(1) level is generated.

In the staticizing circuits 16 the RNEO(1) level enables the TEC gate 166 and the RIP gate 70. This level also initiates a memory read cycle. In the EO control circuits the RNEO(1) level enables set gate 98 of the PEX flip-flop and also enables the set gate of the EO register 22.

*(c) Retrieve next elementary operation*

During timing pulse T1 of the RNEO step the contents of the elementary counter 20 are gated to the address bus 2. During timing pulse T2 the elementary counter 20 is incremented by one unit. During timing pulse T4 the contents of the memory location 100 are transferred to data bus 10 and to elementary operation register 22. During timing pulse T6 the EXEO flip-flop is set, and in the operation retrieval circuits (FIGURE 4) the RNEO flip-flop is reset.

As indicated in FIGURE 8 the contents of memory location 100 specify an elementary operation EO1 calling for the word specified by the contents of the X counter (digit $D5=3$) to be transferred to the accumulator (digits $D3$ and $D2=07$) and for the X counter to be incremented (digit $D4=7$). The operation decoder 92 (FIGURE 3C) senses the operation digit D6 from the EO register 22 and generates the EO1 level. In the staticizing circuits 16 the EO1 level enables the RIP and REP gates. The code recognition gate 28 recognizes digit D4 providing a high output. The address decoder 58 senses the digit D5 (equal to 7) generating the AXC level. Gate 86 is enabled and passes the digits D2 and D3 (bits 3–8) to the control bus 14 and the R7 decoder 206 provides a high output. The EO1 level also generates a memory read cycle.

*(d) Execute EO1*

During timing pulse T1 the contents of the X counter are transferred to the X bus. During timing pulse T2 the REP pulse is generated activating the accumulator reset gate 130 to clear the accumulator 124. Also, during timing pulse T2 the TXC level is generated incrementing the X counter. During timing pulse T4 the contents of memory location 305 are transferred to the data bus and via the accumulator set gates 126 to the accumulator. In the present example, the contents of memory location 305 are equal to octal 6. During timing pulse T6 the EXEO flip-flop is reset.

In the operation retrieval circuits (FIGURE 4) the EXEO(1) level and the INC level cause the NEO flip-flop to be set at time T4 and the RNEO flip-flop to be set at time T6. The RNEO(1) level initiates a memory read cycle and enables the reset gate of the EOR register 22. In the staticizing circuits 16 the RNEO(1) level generates the AEC level and enables the TEC gate.

*(e) Retrieve next elementary operation*

During the next machine step, the contents of the elementary counter 20, in the present case address 101, are transferred to the address bus 2. During timing pulse T2 the EO register 22 (FIGURE 3C) is reset. During timing pulse T4 the contents of memory location 101 are transferred to the data bus and to the EO register 22, and the PEX flip-flop is set. During timing pulse T6 the EXEO flip-flop is set generating the EXEO(1) level. As indicated in FIGURE 8 the contents of the memory location 101 specify elementary operation EO2 (digit D6). This operation calls for the contents of the accumulator (digits D2 and D3) to be transferred to the memory location specified by the Y counter (digit D5) and the Y counter to be incremented by one unit (digit D4).

The operation decoder (FIGURE 3C) senses digit D6 of the elementary operation word and generates the EO2 level. The address decoder 202 senses digit D5 to generate the AZC level. The recognition gate 28 senses digit D4 and provides an output to enable the TZC gate. Digits D2 and D3 are passed by gate 86 to the control bus 14 and decoder R7 senses these digits and provides a high output.

*(f) Execute EO2*

The EO2 operation initiates a memory write cycle and enables the ROP gate. During the execution cycle at timing pulse T1 the contents of the Z counter, in the present example 400, are transferred to the address bus. During timing pulse T2 the Z counter is incremented by one unit due to the presence of the TZC pulse.

During timing pulse T3 the ROP pulse is generated activating the accumulator unit output gates 128 to transfer the accumulator contents (decimal 6) to the data bus and via output gates 32 to the memory unit. During timing pulse T6 the EXEO flip-flop is reset, and in the operation retrieved circuits (FIGURE 4) the RNEO(1) flip-flop is set.

*(g) Retrieve next elementary operation*

The RNEO(1) level starts a memory read cycle, enables the set reset gates of the EO register 22, and in the staticizing circuits 16 enables the RIP gate, generates the AEC level, and enables the TEC gate. During timing pulse T1 the contents of the elementary counter 20 (address 102) are gated to the address bus 2. During timing pulse T2 the EC counter is incremented by one unit and the EO register 22 is reset. During timing pulse T4 the RIP pulse is generated and the data transferred from the memory to the data bus 10 and to the EO register 22. During timing pulse T4 the PEX register is also set. During timing pulse T6 the EXEO(1) level is generated and the RNEO(1) level terminated.

In the present example, as indicated in FIGURE 8, the contents of memory location 102 is an elementary operation (digit D1 equals 7). The operation EO3 (digit D6 equals 3) is a conditional branch operation. This operation specifies a terminal condition for the sector transfer instruction. That is, the contents of the X and Y counters are to be compared. If they are not equal then the elementary operation stored in the memory location designated by digits D2–D5 of the EO3 word is to be retrieved and executed next. If the contents of the X and Y counter are equal then the next elementary operation in the interpretive sequence is to be retrieved and executed. Thus, this elementary operation is a data dependent operation using the comparator unit 84 (FIGURE 3D).

Digit D6 of the EO register word is applied to the operation decoder generating the EO3 level. Digit D5 is sensed by the address decoder and since it is "0" no output is generated. Also, digit D4 is sensed by the recognition gates 28 but no output is produced since, in the present instance, it is a "1". Accordingly, the elementary counter 20 is not incremented during this test operation and it remains addressing memory location 103 (FIGURE 8).

In the staticizing circuits 16 the EO3 level enables the REP and RIP gates and enables one input to the gate 82 of the R2 encoder. The second input of gate 82 is enabled by the comparator 84 output which is low when the X and Y counters have unequal contents and is high when their contents are equal. The comparator output is inverter 83 before being applied to gate 82.

The inverter 83 output $X \neq Y$ and the EO3 level are applied to the EO register output gates 52. Hence, the gates 83 are enabled when the contents of the X and Y counters are unequal during the conditional branch operation.

*(h) Execute EO3*

The EO3 level generates a memory read cycle. The contents of the X and Y counters are applied to comparator 84 and in the example produce a relatively high output since $X=Y$ (both equal 106). This output is inverted and applied to gate 82 as a low input. Hence, in this case, the R2 code is not generated and the elementary counter 20 remains addressing memory location 104. During timing pulse T2 the REP pulse is blocked from the elementary counter 20 due to the absence of a high output from the encoder R2. The timing pulse T4 is applied to the EO register output gates 52, but, in the present instance, is blocked because the X and Y counters have equal contents.

If the contents of the X and Y counters were unequal then digits D2–D5 (equal 1) of the EO3 word in EO register 22 would be passed to address bus 2 to retrieve the address of the first elementary operation of the interpretive routine for the sector transfer instruction. As described above, the first EO in the sector transfer routine is in memory location 100. The elementary operation word from location 100 would be again retrieved and executed and after execution the X and Y counters would be tested. The sector transfer routine continues in this fashion with the contents of each successive memory location in the work area being transferred to the memory write area. Upon the occurrence of a positive test result, as in the present example, the next elementary operation is retrieved.

*(i) Retrieve next elementary operation*

In the operation retrieval circuits (FIGURE 4) the EXEO(1) level is high and the INC level is high since a sector transfer operation is presently being carried out. Also, the present elementary operation is EO3, hence timing pulse T4 sets the NEO register and timing pulse T6 sets the RNEO register.

In the staticizing circuits 16, the RNEO(1) level generates the AEC level and enables the TEC gate. Also, the RIP gate is enabled. The set and reset gates of the EO register 22 (FIGURE 3C) are enabled. In the EO control circuits 24 the set gate of the PEX flip-flop is enabled.

The EC counter 20 is presently addressing memory location 103 and during timing pulse T1 this address is gated to address bus 2. The elementary counter 20 is incremented during time T2 by the TEC pulse. During timing pulse T4 the contents of address 103 are gated to the data bus and stored in the EO register 22 and the PEX flip-flop is set.

As indicated in FIGURE 8, the contents of memory location 103 is another elementary operation (class digit $D1=7$) and specifies EO4 (operation digit $D6=4$).

*(j) Execute EO4*

Elementary operation EO4 is used to retrieve the next instruction from the memory using the instruction counter 6. This operation acts to return control of the system to the instruction counter 6. In the present example, IC 6 is addressing memory location 212. In the EO control circuits 24 (FIGURE 3C) the operation decoder 92 senses the digit D6 and generates the EO4 level. In the operation retrieval circuits (FIGURE 4) the EXEO(1) and EO4 levels enable set gate 160 of the ST flip-flop causing this flip-flop to be set at time T2, and at time T6 the RNIN(1) level is generated. The EO4 level is applied to inverter 190 which provides a low level input to the set gate of the NEO flip-flop thereby blocking timing pulse T4 from setting the NEO flip-flop. This blocks the EO counter from exercising control of the system. In the staticizing circuits 16 (FIGURE 3C) the EO4 level is applied to inverter 198 which provides a low output to block the decoder input gates 56 and 86. In the EO control circuits 24 the PEX flip-flop is reset during timing pulse T2 and during timing pulse T6 the EXEO flip-flop is reset terminating the EXEO(1) level.

STOP (PROGRAM STEP E OF FIGURE 7)

*(a) Retrieve next instruction*

In the retrieval circuits (FIGURE 4) the RNIN(1) level generates the RI level which initiates a read cycle and which enables the TIC gate and the RIP and REP gates of the staticizing circuits 16 (FIGURE 3C). The RNIN(1) level also enables the reset gates of the IR and EOR registers and the set gate of the IR register.

During time T1 the contents of the IC counter 6 (which at this time is address 212) are gated to the address bus 2. During timing pulse T2 the TIC pulse is generated incrementing IC6 by one to specify memory location 213. During timing pulse T4 the RIP pulse is generated and the instruction in address 212 is gated to the data bus 10 and to the instruction register 12.

As indicated in FIGURE 8 memory address 212 contains an elementary operation (class digit=7) which is specified as EO0 (operation digit $D6=0$). This elementary operation is a programmed stop operation and functions to halt the computer operation. When the computer is restarted the instruction following EO0 in the program is retrieved and executed. The location of this instruction is specified by the instruction counter 6 which was incremented by one during the retrieval of the EO0. The output of the recognition gate 48 (FIGURE 3C) senses the class digit (7) from the instruction register and generates the EOC level. This level activates the EO register set gates 53 and 55 and the EO0 word is transferred from the data bus 10 to the EOR register 22. The RNIN(1) and EOC levels enable the set gates 99 and 98 of the PEX flip-flop. Timing pulse T6 sets the EXEO flip-flop generating the EXEO(1) level. Operation decoder 92 senses the operation digit ($D6=0$) from EO register 22 and generates the EO0 level.

Normally, as described above, the next machine step would involve the retrieval of an elementary operation from the memory. However, in the operation retrieval circuits (FIGURE 4), the EO0 level is inverted by inverter 190 to a low level which blocks the set gate of the NEO flip-flop. Hence, no further operations are generated by the machine since all the retrieval enabling levels are low.

SYSTEM MODIFICATIONS

*Description of FIGURE 13*

In certain applications it is desirable to have one or more of the instructions executed at a higher speed but without requiring extensive rewiring of the control unit. FIGURE 13 is a generalized block diagram of an embodiment of a system according to the invention in which an instruction control module 220 connected between the instruction register 12 and the control bus 14. The control module 220 receives and transmits signals from and to the staticizing circuits 16' (of slightly modified form) and operates to generate elementary operation words which are transmitted to EO register 22. The EO control circuits 24' also are slightly modified. The control module itself may be a fixed memory unit using a diode matrix or other suitable means such as a read-only magnetic element array to provide the elementary operation words.

FIGURE 14 is a schematic diagram of a diode matrix type instruction control module which produces an interpretive sequence of EO words for executing a typical instruction, for example, the add instruction. The control module 220 includes a diode matrix unit having eighteen output gates 230. Each of the eighteen output gates corresponds to a separate one of the eighteen bits of an elementary operation word. Each set of three output gates is used to gate one of the six digits (D1–D6) of an elementary operation word to the data bus 10. The eighteen output gates each receives an input from a corresponding one of eighteen vertical lines of the matrix.

As indicated in FIGURE 8, the interpretive routine for a three-address add instruction IN2 uses four stored elementary operation words. In FIGURE 14 each separate elementary operation word is defined by one of the four horizontal lines of the upper half of the matrix. The eighteen vertical lines correspond to the eighteen bit position $2^0$ through $2^{17}$ of an EO word. Those bit positions of an EO word which have "1" bits are defined in the matrix by a connection between the corresponding vertical lines and the horizontal word line. No connection is made between the vertical lines and the horizontal word lines at "0" bit positions. The connection is preferably made by a non-linear device such as a diode. The eighteen vertical matrix lines connect the cathodes of the respective diodes via a bias resistor 231 to a negative bias source −E1.

The module 220 also may be used in generating the elementary operation words for another instruction IN3. The matrix portion of the IN3 generator is not shown in detail since it differs from the IN2 portion only in the connection of different diodes between the matrix lines.

Inputs to the four horizontal word lines are supplied by four "and" gates G0, G1, G2 and G3. These "and" gates are enabled by the GIN2 (generate instruction 2) level from the decoder 237 of the module. The G0–G3 signals are derived from a two-input, four-output decoding unit 232. The pair of decoding unit inputs are provided by the "1" and "0" outputs of a pair of flip-flops GFF0 and GFF1. The four possible combinations of the "1" and "0" outputs of these flip-flops uniquely define the four decoder output levels G0–G3. A pair of prime flip-flops FF0 and FF1 control the setting and resetting of the CFF0 and CFF1 flip-flops. The FF0 and FF1 flip-flops are controlled by set and reset input gates which receive inputs from a cycling unit 233.

The cycling unit 233 is illustrated as first and second "or" circuits connected to the set gates of the FF0 and FF1 flip-flops, respectively, and a third "or" circuit connected to the reset gate of the FF0 flip-flop. Certain of the horizontal lines of the matrix for each instruction are connected at the ends remote from the G1–G3 gates to the "or" circuits 234–236. The particular connection of the horizontal lines causes the cycling unit to sequence the G1–G3 outputs in desired fashion. In the case of the add instruction IN2, the G0 line is connected to "or" circuit 234, the G1 line is connected to the "or" circuit 236 and the G3 line is connected to "or" circuit 2. The RNIN(1) input from the operation retrieval circuits 16′ (FIGURE 15) is applied to "or" circuit 236 and is directly applied to the reset gate of FF1.

The cycling unit 233 is arranged so that during an instruction retrieval operation both flip-flops FF0 and FF1 are reset during time T2, and during time T4 the decoder input flip-flops CFF0 and CFF1 are reset generating the G0 level.

The operation digits of the word read from the memory during the retrieve next instruction step are applied to a decoder 237. This decoder senses the operation digits D5 and D6 and provides a high output level when the specified instruction is implemented in the control module. In the present example, two operations IN2 and IN3 are sensed and corresponding outputs GIN2 and GIN3 are produced by the decoder 237. These two output levels are combined in "or" circuit 238 and applied as a CMA (control module active) signal to the operation retrieval circuits 16′ (FIGURE 15). The GIN2 level is used as an enabling level for the G0–G3 gates of the add instruction lines. The GIN3 level enables the G0–G3 gates of the IN3 lines. The output gates 230 are activated by a common "and" gate 240 which is controlled by a GFEO(1) level generated by the operation retrieval circuits 16′.

*Description of operation retrieval circuits 16′ (FIGURES 15A, 15B)*

As indicated in FIGURES 15A and 15B when instruction control modules are used in the system, the set input gates of the F and NEO flip-flops are activated by timing pulse T5 instead of T4 as in FIGURE 4. This later timing pulse permits the CMA level to be generated in the control module 220 in those cases in which the instruction is to be generated directly. The CMA level is applied as an inhibiting input to the set input gates 180 and 186 of the F and NEO flip-flops. Inverters are connected between the instruction control module and set gates 180 and 186 so that these gates are normally enabled and control is transferred to an instruction control module only when an instruction encoded in the module is specified.

The GFEO(1) level which enables the output gates 230 of the instruction module is generated by a GFEO flip-flop in the retrieval circuits 16′. This flip-flop has a set input gate 239 which is enabled at one input by the CMA level and at a second input by the normal inputs, for example, the RZA(1) level (FIGURE 4). The set input gate 241 also is activated by timing pulse T5. A reset gate for the GFEO flip-flop is enabled by the EO4 level and is used to reset the GFEO flip-flop during timing pulse T4.

*Description of EO control circuits 24′ (FIGURES 15C, 15D)*

The EO control circuits (FIGURE 3C) are also slightly modified when an instruction control module is used.

The GFEO(1) level is applied from the GFEO flip-flop (FIGURE 15A) via a second set "and" gate 240 (FIGURE 15C) to the EO register 22 set inputs. During timing pulse T6 the data applied to the data bus 10 by the output gates 230 of the control module 220 are stored in the EO register 22.

In the EO control circuits 24′ (FIGURE 15D) the GFEO(1) level is applied as an additional input to the set input "and" gate 98 (FIGURE 3C) of the PEX flip-flop. Also, the set input gate 98 is activated during timing pulse T5 of timing pulse T4. The EXEO flip-flop is set as before at time T6 to generate the EXEO(1) level.

OPERATION OF CONTROL MODULE

Assume now that the add instruction is specified by an instruction word read from the memory. In such case, the operation digits D6, D5 are sensed by decoder 237 (FIGURE 14), to generate the CMA level which is applied to set gates of the F and NEO flip-flops (FIGURES 15A, 15B) to prevent the retrieval of an elementary operation sequence from the memory. The CMA level enables set input gate 241 of the GFEO flip-flop and the GFEO(1) level is generated during timing pulse T5.

The RNIN(1) level from the operation retrieval circuits (FIGURE 4) enables the reset gates of the cycling unit 233 (FIGURE 14). The prime flip-flops FF0 and FF1 are then reset during timing pulse T2 and the CFF0 and CFF1 flip-flops are reset during timing pulse T4 generating the G0 level.

The G0 level together with the GIN2 level activates the G0 gate to apply the first EO word to the output gates 230. These gates are enabled by the GFEO(1) level and are activated by timing pulse T6 to gate the first EO word signals to data bus 10 and to the EO register 22 (FIGURE 15C). The GFEO(1) level also sets the PEX flip-flop (FIGURE 15D) during time T5 and the EXEO flip-flop during time T6 of each cycle.

During the next timing pulse cycle the G1 word is gated in similar manner to the EO register 22, and so on. The G4 line stores the EO4 word (retrieve next instruction) and control is transferred from the instruction control module to the IC counter 6 in usual manner.

Thus, it is apparent that an appreciable performance change can be made in a system arranged according to the invention by using instruction modules. In practice, these instruction modules can be of the "plug-in" type using printed circuit boards to further reduce the rewiring involved in connection with instruction control modules.

*Description of FIGURE 16*

Another embodiment for increasing the operation speed of a system according to the invention is shown in block form in FIGURE 16. This embodiment uses two separate memories with interlaced operating cycles as indicated. The first memory 250 is used to store instructions and data, the second memory 252 is used to store elementary operations. As is well known, random-access memories of conventional type have a "destructive" read operation. That is, unless the word read from a memory location is returned to that same location the information is lost. Accordingly, the memory cycle is arranged to have a read portion between times *t*0 and *t*1 and a regeneration portion between times *t*1 and *t*2. The regeneration portion of the cycle merely restores the information read to the same storage location thus preventing the information from being lost.

During a write operation the memory location is first cleared between times *t*0 and *t*1 and between times *t*1 and *t*2 the new information is written into the cleared location. The regenerate and clear portions of the memory cycle are internal to the memory in that the system using the memory is involved only to the extent that the memory is not available to it at these times.

The elementary operation memory 252 is arranged to be read between the times *t*1 and *t*2 when the first memory 250 is in the regeneration portion of the read cycle. This means that the elementary operation stored in the first memory 252 is available to the system at a time *t*2 of the retrieval cycle whereas in the system of FIGURE 3 it is not available until the next memory cycle. During the times *t*2 and *t*3 the elementary operation memory 252 is regenerated.

Both memory outputs are gated to the data bus 10 and receive addresses from address bus 2. The ICC counter 6 is used to address the instruction memory 250 and the EC counter 20 is used to address the elementary operation memory 252. Also, the IR register output gates of the system of FIGURE 3 are connected to address the elementary operation memory 252.

*Description of FIGURE 17*

Another embodiment for increasing the operation speed of a system according to the invention is shown in FIGURE 17. This embodiment uses a pair of EO registers MEO register 260 and LEO register 262. These registers are arranged to receive two elementary operation words which are read from the same memory location at the same time. In this case, an instruction word has twice as many bits as an EO word. This should be contrasted with the system of FIGURE 3 where the instruction and EO words have the same number of bits. For example, a memory word of 36 bits in length can store two of the eighteen bit elementary operation words of the system of FIGURE 3. When a memory location is addressed, this double EO word is transferred to the data bus 10. As indicated in FIGURE 17, the most significant half of the double EO word is gated to the first elementary operation register MEO. The least significant half of the double word is gated to the second elementary operation register LEO. An elementary operation switch is used to connected selectively the one or the other of the MEO and LEO registers to the staticizing circuits and EO control circuits of the system.

The EO switch may include, for example, two sets of eighteen "and" gates. A like numbered one of the gates in each set is connected to a separate one of the eighteen outputs of the EO switch. One set of these gates is controlled by a MEO level to gate the MEO register contents to the switch outputs. The second set of the "and" gates is controlled by a LEO level to gate the contents of the LEO register to the switch outputs. The MEO and LEO levels can be generated by a flip-flop (not shown) in the operation retrieval circuits (FIGURE 4) or by any other suitable means. The two registers MEO and LEO are reset prior to the retrieval of another memory instruction as indicated for the EO register in FIGURE 3B.

Other conditions of course may be used to determine whether or not the one and the other of the two registers are reset during particular cycles.

What is claimed is:

1. In a data processing system arranged for executing an instruction by a sequence of one or more machine steps beginning with an initial step, said instruction being defined by an instruction word comprising a plurality of digits including operation digits, each of said machine steps being defined by a machine word comprising a plurality of digits including operation digits, a first counting means for storing instruction word addresses, a second counting means for storing machine word addresses, storage means for storing instruction words and machine word, means responsive to an address specified by said first counting means for selecting a word from said storage means, means for sensing said operation digits of said selected word, and means responsive to said means for sensing for inserting an address in said second counting means and for changing said first counting means to specify another address when said selected word is an instruction word.

2. In a data processing system as set forth in claim 1, wherein said storage means includes a fixed memory for storing at least certain ones of said sequences of machine words.

3. In a data processing system having storage means with addressable locations and said system being arranged for executing an instruction by a sequence of one or more machine steps beginning with an initial step, said instruction being defined by an instruction word comprising a plurality of digits including operation and class digits, each of said machine steps being defined by a machine word comprising a plurality of digits including operation and class digits, means for sensing said operation and class digits of an instruction word, and means responsive to said sensing means for sensing said instruction word operation digits for addressing said storage means at the location of the first machine word corresponding to the initial machine step for executing said instruction, said storage means including a first memory for storing said instruction words, and a second memory for storing said machine words, including means for reading and returning an instruction word from and to a location of said first memory, and means for reading a machine word from said second memory during the time that said instruction word is being returned to said location of said first memory.

4. In a data processing system arranged for executing an instruction by a sequence of one or more machine steps beginning with an initial step, said instructions being defined by an instruction word comprising $2n$ digits including operation digits, each of said machine steps being defined by a machine word comprising $n$ digits including operation digits, storage means having locations for storing instruction words and machine words, certain of said locations each storing a pair of said machine words, and certain others of said locations each storing a single instruction word, first and second registers, and means for reading a pair of machine words at one of said certain locations and for inserting one word of said pair into said first register and the other word of said pair into said second register.

5. In a data processing system as set forth in claim 4, wherein said storage means includes a fixed memory having certain ones of said sequences of machine words stored therein.

6. In a stored program data processing apparatus wherein a variable format of instructions are stored in a memory for executing said program, said apparatus having a control unit arranged for executing an instruction in one or more machine steps, a plurality of machine words stored in said memory, each corresponding to a different one of said machine steps, each said instruction being executed under the control of a sequence of said machine words, each instruction word containing address digits for retrieving a sequence of machine words used in its execution, any instruction being identifiable by a class digit and any machine word being identifiable by a different class digit, a first register for storing an instruction word read from said memory, means for sensing the class digit of said read instruction word, and means responsive only to said address digits of said read instruction for reading from said memory the sequence of machine words required for the performance of said read instruction, and means responsive to the last machine word of said read sequence for retrieving the next instruction of said program from said memory.

7. In a stored program data processing apparatus, said program being stored in an addressable storage means in the form of instruction words, said apparatus having a control unit arranged to execute said instructions in one or more machine steps, a plurality of machine words stored in said storage means, each said machine word corresponding to a separate one of said machine steps, a corresponding digit of a stored word having one value for a machine word and another value for an instruction word, first means for controlling said storage means to select a stored instruction, second means for controlling said storage means in response to sensed digits of said instruction words for selecting machine words required to perform said instruction, means for sensing said digit of said instruction and machine words, and means responsive to said sensed digit for transferring control of said storage means from said first controlling means to said second controlling means.

8. In a stored program data processing apparatus, the combination recited in claim 7, said machine words each having an operation digit defining a particular type of machine step, and sensing means responsive to one of said machine word operation digits for transferring control of said storage means from said second to said first controlling means.

9. In a stored program data processing apparatus, storage means for storing instruction words used in performing said program, said storage means also storing machine words used in executing said instructions, an instruction control module for directly executing a certain one or more of said instructions, each instruction word having one or more operation digits defining the operation to be performed and one or more class digits, each machine word having one or more class digits, retrieval circuits for selecting said instruction and machine words from said storage means, control circuits for generating control levels, sensing means responsive to the class digits of a word read from said memory to provide a first output level when an instruction word is retrieved and a second level when a machine word is retrieved, means responsive to said first level and certain of said control levels for enabling said retrieval circuits to select a machine word for retrieval, and further sensing means responsive to said first level and the operation digits of said instruction words for enabling said instruction control module and for inhibiting said retrieval circuits when one of said certain instructions is retrieved.

10. In a stored program data processing apparatus, storage means for storing instruction words corresponding to instructions, each of said instructions being executed by a series of machine steps, machine words each corresponding to one of said machine steps, a plurality of sequences of one or more machine words stored in said storage means, each different sequence corresponding to a different instruction word, each instruction having operation and class digits, and each machine word having operation and class digits, said program being defined by a sequence of instruction and machine words in said storage means, first means for controlling said storage means to read the instruction and machine words of said program, sensing means responsive to said class digits for providing a first level when an instruction word is read and a second level when a machine word is read, second means responsive only to a sensed instruction word from said storage means for controlling said storage means to read the sequence of machine words corresponding to an instruction, means for controlling said first means for retrieving the next word in the program when the previous word of said program sequence was a machine word, and for transferring control to said second means when the previous word of said program was an instruction word.

11. In a stored program data processing apparatus, the combination as recited in claim 10, wherein the number of digits in an instruction word is a multiple of the number of digits in a machine word.

12. In a stored program data processing apparatus, storage means for storing instruction words corresponding to instructions, each of said instructions being executed by a series of machine steps, machine words each corresponding to one of said machine steps, a plurality of sequences of one or more machine words stored in said storage means, different sequences of said machine words corresponding to different instruction words, a table of the first address of each machine word sequence stored in said storage means, each instruction having operation and class digits, and each machine word having operation and class digits, said program being defined by a sequence of instruction and machine words in said storage means, first means for controlling said storage means to read the instruction and machine words of said program, sensing means responsive to said class digits for providing a first level when an instruction word is read and a second level when a machine word is read, second means for controlling said storage means to read the sequence of machine words corresponding to an instruction, means for controlling said first means for retrieving the next word in the program when the previous word of said program sequence was a machine word, and means responsive only to the operation digits of an instruction word for addressing said table to retrieve the first address of the machine word sequence corresponding to that instruction and for transferring control to said second means.

13. In a stored program data processing apparatus, storage means for storing instruction words corresponding to instructions, each instruction being executed by a sequence of machine steps, said storage means storing variable formats of machine words, each different format corresponding to a different instruction word, and each different machine word corresponding to a different machine step, each machine word having control digits including operation digits defining a type of machine step, retrieval means for retrieving instruction and machine words from said storage means, a register, means controlling said retrieval means to retrieve an instruction word and insert it in said register, control means for executing said machine words, and means for operating said retrieval and control means to alternately retrieve and execute the format of machine words corresponding to said instruction word inserted in said register.

14. In a stored program data processing apparatus as set forth in claim 13, wherein said storage means includes a fixed memory for storing at least certain ones of said formats of machine words.

15. In a stored program data processing apparatus, the combination as recited in claim 14, including sensing means for sensing the operation digits of said machine words retrieved from said storage means, with a separate level being produced by said sensing means for each different combination of sensed machine word operation digits.

16. In a stored program data processing apparatus, the combination as recited in claim 14, including an instruction control module for directly executing certain instructions, a decoder for sensing the operation digits of an instruction word in said register, said decoder normally providing one output level and providing other output levels each corresponding to a different one of said certain instructions, any one of said other output levels from said decoder operating to block said retrieval circuits from retrieving machine words from said storage means and to activate said control module.

17. In a data processing apparatus arranged for executing an instruction by a sequence of one or more machine steps, each machine step being defined by a machine word, storage means for storing machine and data words, said apparatus including a plurality of register means each capable of receiving and transmitting a data word, each machine word comprising a plurality of digits including one or more operation digits, and one or more digits for designating a register, retrieval circuits for retrieving a machine word from said storage means, first sensing means responsive to the operation digits of a retrieved machine word for producing a corresponding output level, second sensing means responsive to said other digits of a retrieved machine word for selecting one of said plurality of register means, means responsive to said first sensing means output to initiate a write or read operation for said storage means, and means responsive to said second sensing means output to enable the said selected register to correspondingly transmit to or receive a data word from said storage means.

18. In a data processing apparatus arranged for executing an instruction by a sequence of one or more machine steps, each machine step being defined by a machine word, a first storage means for storing machine words, a second storage means for storing data words, said apparatus including a plurality of register means each capable of receiving and transmitting a data word, each machine word comprising a plurality of digits including one or more operation digits and one or more other digits for designating a register, retrieval circuits for retrieving a machine word from said first storage means, first sensing means responsive to the operation digits of a retrieved machine word for producing a corresponding output level, second sensing means responsive to said other digits of a retrieved machine word for selecting one of said plurality of register means, means responsive to said first sensing means output to initiate a write or read operation for said second storage means, and means responsive to said second sensing means output to enable the designated register to correspondingly transmit to or receive a data word from said second storage means.

19. In a data processing apparatus, the combination as recited in claim 18, wherein each machine word has one or more further digits for designating a register for addressing said second storage means, and sensing means responsive to said further digits for enabling said addressing regiter to transmit address signals to said second storage means.

20. In a data processing apparatus, the combination as recited in claim 19, said machine words each having one or more additional digits for incrementing an addressing register, sensing means responsive to said additional digits for producing one level when said addressing register is to be incremented and another level when said addressing register is not to be incremented, and means responsive to said last-mentioned levels for incrementing or not incrementing said addressing register after said address signals are transmitted.

21. In a data processing system, having storage means with addressable locations and said system being arranged for executing an instruction by a sequence of one or more machine steps beginning with an initial step, said instruction being defined by an instruction word comprising a plurality of digits including operation digits, each of said machine steps being defined by a machine word comprising a plurality of digits including operation digits, sensing means for sensing said operation digits of said instruction word, and means responsive to said sensing means to produce an address for addressing said storage means at the location of the first machine word corresponding to the initial machine step for executing said instruction.

22. In a data processing system as claimed in claim 21, wherein said storage means includes a first memory for storing said instruction words, and a second memory for storing said machine words and including a register, said means responsive to said sensing means including means to store said operation digits of said instruction word in said register to produce an address for said second memory.

No references cited.

ROBERT C. BAILEY, *Primary Examiner.*

P. J. HENON, *Assistant Examiner.*